(12) United States Patent
Maeda

(10) Patent No.: US 11,012,679 B2
(45) Date of Patent: May 18, 2021

(54) GENERATING APPARATUS, GENERATING METHOD, AND STORAGE MEDIUM

(71) Applicant: CANON KABUSHIKI KAISHA, Tokyo (JP)

(72) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/667,659

(22) Filed: Oct. 29, 2019

(65) Prior Publication Data

US 2020/0068188 A1 Feb. 27, 2020

Related U.S. Application Data

(63) Continuation of application No. PCT/JP2018/044202, filed on Nov. 30, 2018.

(30) Foreign Application Priority Data

Dec. 4, 2017 (JP) .............................. JP2017-232480

(51) Int. Cl.
*H04N 13/282* (2018.01)
*H04N 13/243* (2018.01)
*G06T 15/20* (2011.01)
*G06T 17/00* (2006.01)

(52) U.S. Cl.
CPC ........... *H04N 13/282* (2018.05); *G06T 15/20* (2013.01); *G06T 17/00* (2013.01); *H04N 13/243* (2018.05); *G06T 2200/08* (2013.01)

(58) Field of Classification Search
CPC combination set(s) only.
See application file for complete search history.

(56) References Cited

U.S. PATENT DOCUMENTS

| 2008/0181488 A1 | 7/2008 | Ishii |
| 2011/0102596 A1* | 5/2011 | Kotani ................. H04N 13/204 348/159 |
| 2013/0225289 A1 | 8/2013 | Yoshimitsu |
| 2017/0322017 A1 | 11/2017 | Aoki |

FOREIGN PATENT DOCUMENTS

| CN | 101610421 A | 12/2009 |
| CN | 102932657 A | 2/2013 |
| CN | 109565582 A | 4/2019 |
| EP | 3229459 A1 | 11/2017 |

(Continued)

*Primary Examiner* — Md N Haque
(74) *Attorney, Agent, or Firm* — Canon U.S.A., Inc. I.P. Division

(57) ABSTRACT

In an image processing system having a plurality of image capturing units, it aims to be able to generate a wide-area image from a high-quality virtual viewpoint. In order to achieve such an object, first image data is obtained based on a captured image obtained by an image capturing device belonging to a first image capturing device group, second image data is obtained based on a captured image obtained by an image capturing device belonging to a second image capturing device group, information related to a position and a direction of a virtual viewpoint is obtained, and a virtual viewpoint image is generated based on the first image data, the second image data, and the information related to the position and the direction of the virtual viewpoint.

16 Claims, 22 Drawing Sheets

(56) References Cited

FOREIGN PATENT DOCUMENTS

| | | | |
|---|---|---|---|
| JP | 2008-187564 A | | 8/2008 |
| JP | 2014-215828 A | | 11/2014 |
| JP | 2014215828 | * | 11/2014 |
| JP | 2017-212593 A | | 11/2017 |
| WO | 2008-187564 A | | 8/2008 |
| WO | 2016/088437 A | | 6/2016 |
| WO | 2017/204174 A1 | | 11/2017 |

* cited by examiner

| TIME CODE |
| --- |
| NUMBER OF GAZE POINTS |
| POINTER TO 1ST GAZE POINT |
| ... |
| POINTER TO pTH GAZE POINT |

(B)

| x COORDINATE OF 1ST GAZE POINT FROM FIELD ORIGIN |
| --- |
| y COORDINATE OF 1ST GAZE POINT FROM FIELD ORIGIN |
| z COORDINATE OF 1ST GAZE POINT FROM FIELD ORIGIN |
| NUMBER OF OBJECTS |
| POINTER TO 1ST OBJECT |
| NUMBER OF POINTS OF 1ST OBJECT |
| ADDRESS TO 2ND OBJECT |
| NUMBER OF POINTS OF 2ND OBJECT |
| ... |
| ADDRESS TO nTH OBJECT |
| NUMBER OF POINTS OF nTH OBJECT |

(C)

| x COORDINATE OF CIRCUMSCRIBED CUBE ORIGIN OF 1ST OBJECT |
| --- |
| y COORDINATE OF CIRCUMSCRIBED CUBE ORIGIN OF 1ST OBJECT |
| z COORDINATE OF CIRCUMSCRIBED CUBE ORIGIN OF 1ST OBJECT |
| x SIZE OF CIRCUMSCRIBED CUBE OF 1ST OBJECT |
| y SIZE OF CIRCUMSCRIBED CUBE OF 1ST OBJECT |
| z SIZE OF CIRCUMSCRIBED CUBE OF 1ST OBJECT |
| x COORDINATE OF 1ST POINT FROM FIELD ORIGIN |
| y COORDINATE OF 1ST POINT FROM FIELD ORIGIN |
| z COORDINATE OF 1ST POINT FROM FIELD ORIGIN |
| x COORDINATE OF 2ND POINT FROM FIELD ORIGIN |
| y COORDINATE OF 2ND POINT FROM FIELD ORIGIN |
| z COORDINATE OF 2ND POINT FROM FIELD ORIGIN |
| ... |
| x COORDINATE OF mTH POINT FROM FIELD ORIGIN |
| y COORDINATE OF mTH POINT FROM FIELD ORIGIN |
| z COORDINATE OF mTH POINT FROM FIELD ORIGIN |

GENERATING APPARATUS, GENERATING METHOD, AND STORAGE MEDIUM

CROSS-REFERENCE TO RELATED APPLICATIONS

This application is a Continuation of International Patent Application No. PCT/JP2018/044202, filed Nov. 30, 2018, which claims the benefit of Japanese Patent Application No. 2017-232480, filed Dec. 4, 2017, both of which are hereby incorporated by reference herein in their entirety.

BACKGROUND OF THE INVENTION

Field of the Invention

The present invention relates to a generating apparatus, a generating method, and a program.

Description of the Related Art

A technique that installs a plurality of cameras (image capturing apparatuses) respectively at different positions, performs synchronous capture from multiple viewpoints, and generates a virtual viewpoint image by using a plurality of viewpoint images obtained by the capture has attracted attention. According to the technique for generating the virtual viewpoint image from the plurality of viewpoint images, for example, since a highlight scene of soccer or basketball can be seen from various angles, it enables to give a user high realistic sensation as compared with a normal image.

Japanese Patent Application Laid-Open No. 2014-215828 discloses that a plurality of cameras are arranged so as to surround a subject, the subject is captured by the cameras, and an arbitrary virtual viewpoint image is generated and displayed using captured images obtained by the cameras. In Japanese Patent Application Laid-Open No. 2014-215828, the world coordinates X, Y and Z axes are determined with the center point of a stadium as the origin, and the plurality of cameras are installed toward the origin such that the origin is at the center of a screen.

In the technique described in Japanese Patent Application Laid-Open No. 2014-215828, in a case where an entire landscape is generated with the center of the stadium as a gaze point (point of direction, target point), the number of cameras that are capturing a player who is away from the gaze point is small, and moreover the relevant player is not in focus as compared with near the gaze point. As a result, for example, in case of generating an entire landscape obtained by seeing the other side stand from a side stand far from the viewpoint, the resolution of a this-side player who should be clearly visible because the distance to him/her is short is lower and thus his/her outline blurs, thereby decreasing accuracy of a 3D (three-dimensional) model. For this reason, the image quality of the this-side player is deteriorated, whereas the image quality of a player near the center farther from the this-side player is improved, so that a sense of perspective is impaired and thus realistic sensation is lowered.

SUMMARY OF THE INVENTION

The present invention has been completed in view of such a circumstance, and an object thereof is to enable, in an image processing system having a plurality of image capturing units, generation of a wide-area image from a high-quality virtual viewpoint.

A generating apparatus according to the present invention is a generating apparatus that generates a virtual viewpoint image on the basis of a plurality of captured images obtained by a plurality of image capturing devices, the plurality of image capturing devices being classified into a plurality of image capturing device groups including a first image capturing device group constituted by the plurality of image capturing devices pointed to a first gaze point and a second image capturing device group constituted by the plurality of image capturing devices pointed to a second gaze point different from the first gaze point, the generating apparatus is characterized by comprising: a first obtaining unit configured to obtain first image data based on the captured image obtained by the image capturing device belonging to the first image capturing device group; a second obtaining unit configured to obtain second image data based on the captured image obtained by the image capturing device belonging to the second image capturing device group; a third obtaining unit configured to obtain information related to a position and a direction of a virtual viewpoint; and a generating unit configured to generate the virtual viewpoint image based on the first image data obtained by the first obtaining unit, the second image data obtained by the second obtaining unit, and the information related to the position and the direction of the virtual viewpoint obtained by the third obtaining unit.

Further features of the present invention will become apparent from the following description of exemplary embodiments with reference to the attached drawings.

BRIEF DESCRIPTION OF THE DRAWINGS

FIG. 16 is a diagram illustrating a constitution example of 3D model data according to the second embodiment.

DESCRIPTION OF THE EMBODIMENTS

Hereinafter, preferred embodiments of the present invention will be described with reference to the attached drawings.

First Embodiment

A first embodiment of the present invention will be described.

Figure 1:
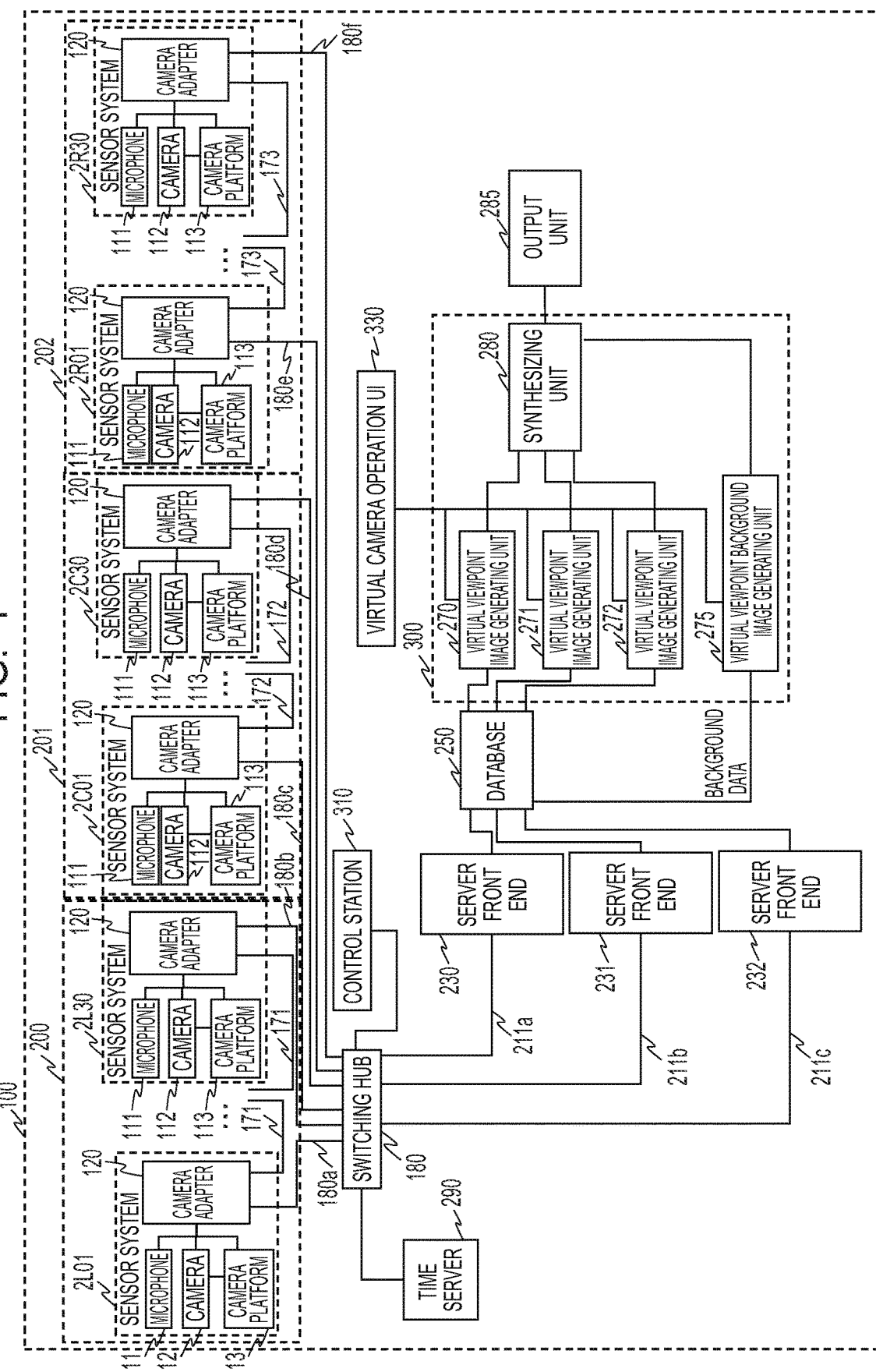
FIG. 1 is a diagram illustrating a constitution example of an image processing system according to a first embodiment.

FIG. 1 is a diagram illustrating a constitution example of an image processing system 100 according to the first embodiment. The image processing system 100 according to the present embodiment is an image processing system that performs image capture and sound collection by installing a plurality of cameras (image capturing apparatuses) and microphones (sound collecting apparatuses) in facilities such as a stadium (field), a concert hall and the like.

The image processing system 100 has sensor groups 200, 201 and 202 for respective gaze points. Each of the sensor groups 200, 201 and 202 has a plurality of sensor systems. In the present embodiment, the sensor group 200 has 30 sensor systems 2L01 to 2L30, the sensor group 201 has 30 sensor systems 2C01 to 2C30, and the sensor group 202 has 30 sensor systems 2R01 to 2R30. Besides, each sensor system has a microphone 111, a camera 112, a camera platform 113, and a camera adapter 120. That is, each of the sensor groups 200, 201 and 202 has the plurality of cameras for capturing a subject respectively from a plurality of directions.

Figure 2:
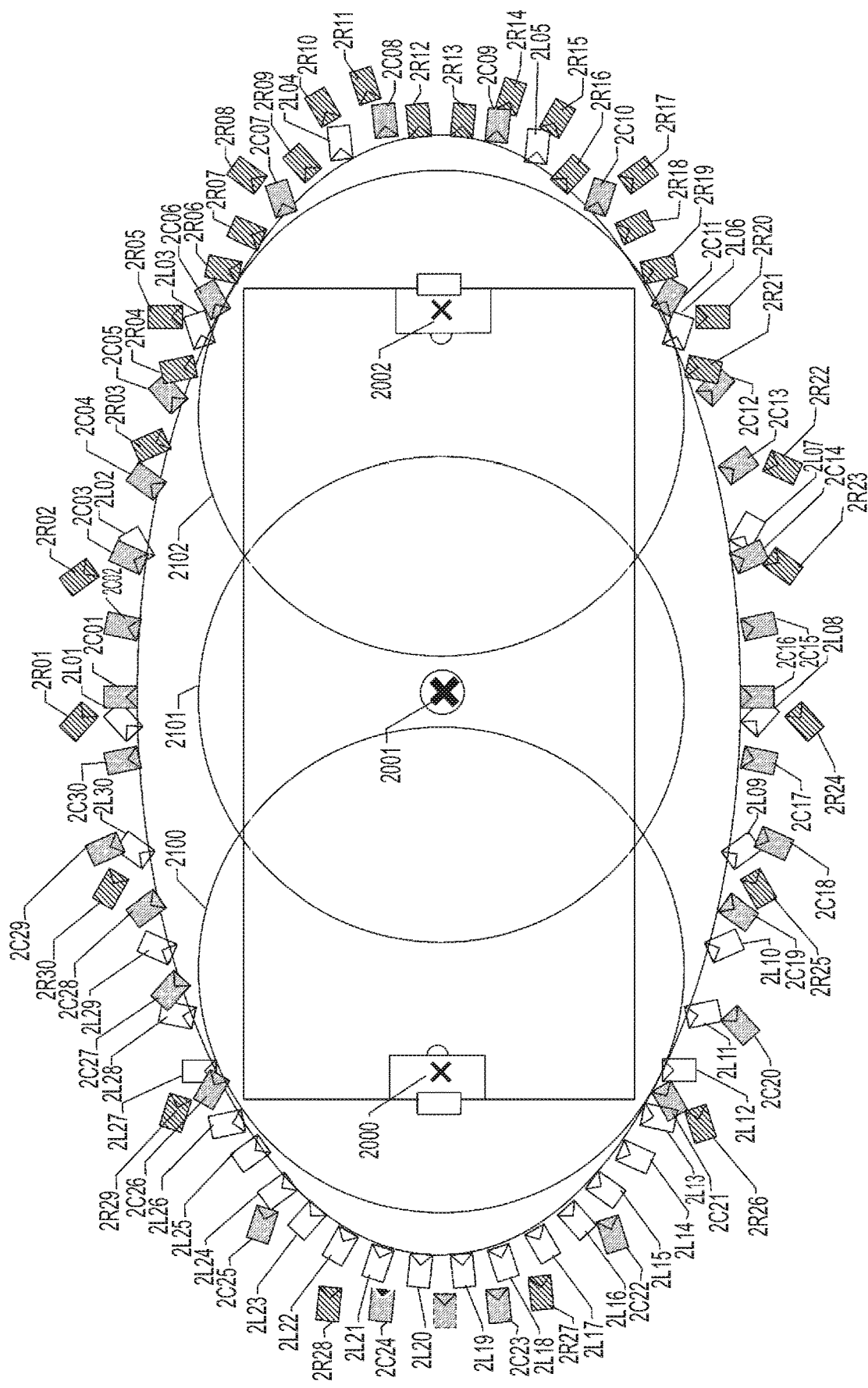
FIG. 2 is a diagram illustrating an example of an object capturing state in the first embodiment.

As exemplarily illustrated in FIG. 2, in each of the sensor systems 2L01 to 2L30 of the sensor group 200, the camera 112 is installed for a gaze point 2000 as the gaze point. Similarly, in each of the sensor systems 2C01 to 2C30 of the sensor group 201, the camera 112 is installed for a gaze point 2001 as the gaze point. Moreover, in each of the sensor systems 2R01 to 2R30 of the sensor group 202, the camera 112 is installed for a gaze point 2002 as the gaze point. The cameras 112 of the sensor systems 2L01 to 2L30 corresponding to the gaze point 2000 capture the range of an area 2100, the cameras 112 of the sensor systems 2C01 to 2C30 capture the range of an area 2101, and the cameras 112 of the sensor systems 2R01 to 2R30 capture the range of an area 2102. Here, although an example in which the 30 sensor systems constitute one sensor group is shown, the number and arrangement of the sensor systems are not limited to this.

An operation of the sensor group 200 will be described.

The image processing system 100 has a control station 310 and a virtual camera operation UI (user interface) 330 in order to perform control according to a user's instruction or the like. The control station 310 performs management of an operation state, parameter setting/control, and the like for each function unit (block) provided in the image processing system 100, via a network. An operation of transmitting the images and sounds obtained by the 30 sensor systems 2L01 to 2L30 from the sensor system 2L30 to a server front end 230 via a switching hub 180 will be described. Here, the sensor systems 2L01 to 2L30 are connected in a daisy chain via networks 180a, 171 and 180b.

Each of the sensor systems 2L01 to 2L29 inputs an image captured by the camera 112 to the camera adapter 120, gives a camera identifier for identifying the camera to the captured image, and transmits the obtained image to the network 171. The sensor system 2L30 inputs an image captured by the camera 112 to the camera adapter 120, and gives a camera identifier for identifying the camera to the captured image. Then, the sensor system 2L30 transmits the image captured by each camera 112 of the sensor group 200 to the network 180b. The image transmitted to the network 180b is input to the server front end 230 via the switching hub 180 and a network 211a.

Incidentally, in the present embodiment, when there is no specific explanation, the 30 sets of the sensor systems from the sensor system 2L01 to the sensor system 2L30 are described as a sensor system 2L without being distinguished. Similarly, the devices in each sensor system 2L are respectively referred to as the microphone 111, the camera 112, the camera platform 113 and the camera adapter 120 without being distinguished, unless otherwise explained. In the present embodiment, the term "image" will be described as including a concept of a moving image and a concept of a still image unless otherwise specified. That is, the image processing system 100 according to the present embodiment can process both the still image and the moving image.

Incidentally, although the example in which the plurality of sensor systems 2L are cascade-connected so as to be the daisy chain is described, the present invention is not limited to this. For example, it may be a star-type network configuration in which each of the sensor systems 2L01 to 2L30 is connected to the switching hub 180 and data exchange is performed among the sensor systems 2L via the switching hub 180. Besides, for example, the plurality of sensor systems 2L may be divided into several groups, and the sensor systems 2L may be daisy-chained for each of the divided groups. Of course, in a case where there is one sensor system 2L in the group, a star-type connection may be used.

Besides, the sensor system 2L is not limited to the above-described constitution. For example, the camera 112 and the camera adapter 120 may be integrally constituted in the sensor system. In this case, the microphone 111 may be built in the integrated camera 112 or may be connected to the outside of the camera 112. Besides, the server front end 230 may have at least a part of the functions of the camera adapter 120. The sensor systems 2L01 to 2L30 are not limited to have the same constitution, and may have different constitutions.

Besides, in the present embodiment, a Model Based Rendering (hereinafter abbreviated as MBR) for constituting a 3D model will be described as a method for generating a virtual viewpoint image. However, the present invention is not limited to this.

Besides, in the present embodiment, although an example in which virtual viewpoint contents provided by the image processing system 100 include the virtual viewpoint image and a virtual viewpoint sound will be described, the present invention is not limited to this. For example, a sound may not be included in the virtual viewpoint contents. Moreover, for example, the sound included in the virtual viewpoint contents may be the sound collected by the microphone 111 of the sensor system 2L installed at the position closest to the virtual viewpoint. Moreover, in the present embodiment, for the sake of simplicity of explanation, the description concerning the sound is partially omitted, but it is basically assumed that both the image and the sound are processed together.

That is, the sound collected by the microphone 111 of the sensor system 2L01 and the image captured by the camera 112 are subjected to an image process by the camera adapter 120, and then the processed sound and image are transmitted to the camera adapter 120 of the sensor system 2L02 via the network 171. Similarly, the sensor system 2L02 combines the collected sound, the captured image and the image and sound data obtained from the sensor system 2L01 together, and transmits the obtained data to the sensor system 2L03 via the network 171. By continuing the above operation, the images and sounds obtained by the sensor systems 2L01 to 2L30 are transmitted from the sensor system 2L30 to the server front end 230 via the networks 180b and 211a and the switching hub 180.

The same is applied to the sensor groups 201 and 202. The sensor systems 2C01 to 2C30 are daisy-chained via networks 180c, 172 and 180d, and the sensor systems 2R01 to 2R30 are daisy-chained via networks 180e, 173 and 180f. Images and sounds respectively obtained by the sensor systems 2C01 to 2C30 are transmitted from the sensor system 2C30 to a server front end 231 via the networks 180d and 211b and the switching hub 180. Besides, images and sounds respectively obtained by the sensor systems 2R01 to 2R30 are transmitted from the sensor system 2R30 to a server front end 232 via the networks 180f and 211c and the switching hub 180.

Although FIG. 1 illustrates the constitution in which all the insides of the sensor groups 200, 201 and 202 are cascade-connected so as to form the daisy chains, the present invention is not limited to this. For example, in order to form the daisy chains, the sensor system 2L30 of the sensor group 200 and the sensor system 2C01 of the sensor group 201 may be connected, and the sensor system 2C30 of the sensor group 201 and the sensor system 2R01 of the sensor group 202 may be connected.

A time server 290 has a function of distributing time and a synchronization signal, and distributes the time and the synchronization signal to the sensor systems 2L01 to 2L30, 2C01 to 2C30, and 2R01 to 2R30 via the switching hub 180, respectively. The camera adapter 120 of the sensor system that has received the time and the synchronization signal performs image frame synchronization by externally synchronizing (Genlock) the camera 112 based on the time and the synchronization signal. That is, the time server 290 synchronizes the capturing timings of the plurality of cameras 112.

Next, the constitution and operation of the server front end 230 to which the images and sounds respectively obtained by the sensor systems 2L01 to 2L30 of the sensor group 200 are transmitted will be described. The server front end 230 reconstructs a segmented transmission packet from the image and sound obtained from the sensor system 2L30, and converts a data format of frame data. Moreover, the server front end 230 cuts out a target such as a player or the like (hereinafter also referred to as "object") from the reconstructed frame data, and generates a 3D model of the object from the images of all the cameras using the cut-out result as a foreground image.

There are various methods for generating a 3D model. It is possible to use, e.g., a method such as visual cone intersection method (shape from silhouette method). For example, the generated 3D model is expressed as a point group. For example, the point group represents the number of points existing in the 3D model, and each point of the point group can be represented by an x-coordinate, a y-coordinate and a z-coordinate in a coordinate system using the gaze point as the origin. However, the present invention is not limited to this. Namely, it may be possible to divide a space into voxels with the gaze point as the origin, binarize the voxel in which the object exists to "1", binarize the voxel in which the object does not exist to "0", and encode the obtained binary data as one-dimensional data by scanning them respectively in the x-axis, y-axis and z-axis directions. The server front end 230 gives an identifier for identifying the 3D model to the relevant 3D model, and writes the obtained data into the database 250 according to a frame number together with point group data of the 3D model.

Moreover, the server front end 230 writes the foreground image in the database 250 in accordance with the camera identifier, an identifier of the gaze point, the identifier of the associated 3D model, and the frame number. Here, although the frame number is used as information representing the time, the present invention is not limited to this. Namely, a time code may be used. In the database 250, the gaze point identified by the identifier of the camera, a camera position, a direction, and an angle of view are stored as camera setting information at the time of camera setting. The database 250 generates an object position information list in which position information of the object is described for each identifier of the 3D model in units of input frame number.

In the database 250, position information of each of the gaze points 2000 and 2002 in a case where the gaze point 2001 of FIG. 2 is used as the origin (0, 0, 0) of the stadium coordinates is further stored. Incidentally, it should be noted that the gaze points 2000, 2001 and 2002 have the same directions represented by the x-axis, the y-axis and the z-axis. That is, in the present embodiment, the gaze points 2000, 2001 and 2002 are on the same line, and the direction connecting them is the x-axis. Here, in the x-axis, it is assumed that the direction from the gaze point 2001 to the gaze point 2000 is negative and the direction from the gaze point 2001 to the gaze point 2002 is positive. The y-axis is orthogonal to the x-axis. In the y-axis, it is assumed that a main stand direction from the gaze point 2001 to the front of the stadium is negative and a back stand direction is positive. In FIG. 2, it is assumed that the bottom (for example, the side where the sensor system 2L08 is installed) is the main stand and the top (for example, the side where the sensor system 2L01 is installed) is the back stand. The z-axis is orthogonal to the x-axis and the y-axis. In the z-axis, it is assumed that the ground surface is the origin and the upward direction is positive.

Figure 3:
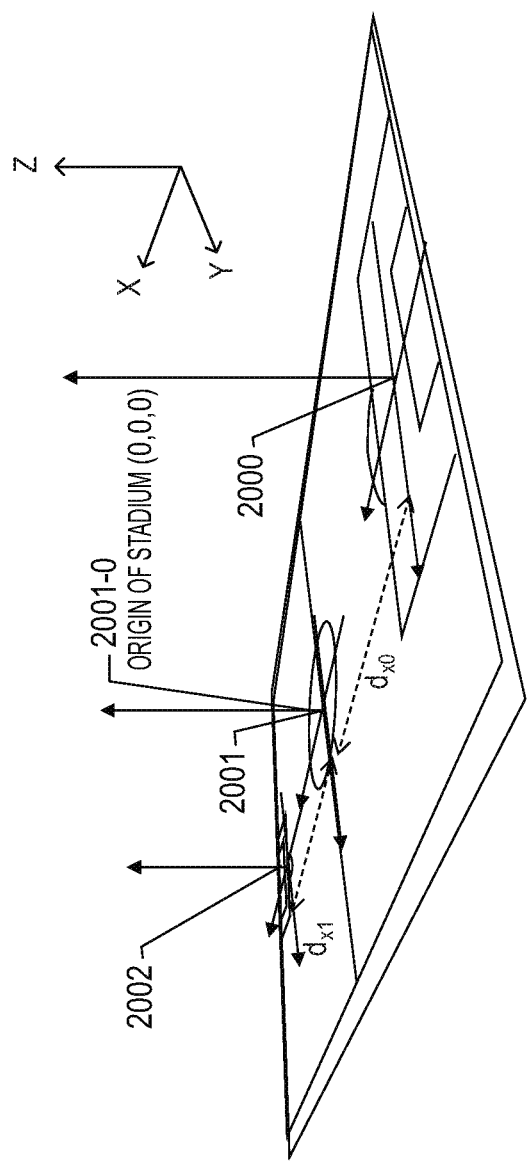
FIG. 3 is a diagram for describing a coordinate system of a gaze point in the first embodiment.

FIG. 3 illustrates the x-axis, the y-axis, the z-axis, and the gaze points 2000, 2001 and 2002. The gaze point 2000 is separated by $(-d_{x0})$ in the x direction and the gaze point 2002 is separated by $d_{x1}$ in the x direction with respect to the gaze point 2001 that is an origin 2001-0 of the stadium coordinates. Therefore, the gaze point 2000 is $(-d_{x0}, 0, 0)$ with respect to the gaze point 2001, and the gaze point 2002 is $(d_{x1}, 0, 0)$ with respect to the gaze point 2001. The position information of the objects to be described in the above object position information list is described in the world coordinates using, as the origin, the gaze point 2001 obtained by correcting displacements of the positions of these gaze points. The axial directions and the positional relationships of the gaze points are not limited to this. Also, the position of the coordinate origin of the stadium is not limited to this. Namely, it may be possible to set any corner of the field as the origin, or place the origin on the main stand. Besides, it is not always necessary that the gaze point exists at the origin of the stadium.

Similarly, in the server front ends 231 and 232, the data and the position information of the 3D models having the position information with each gaze point as the origin are written in the database 250 together with the foreground image.

Figure 4:
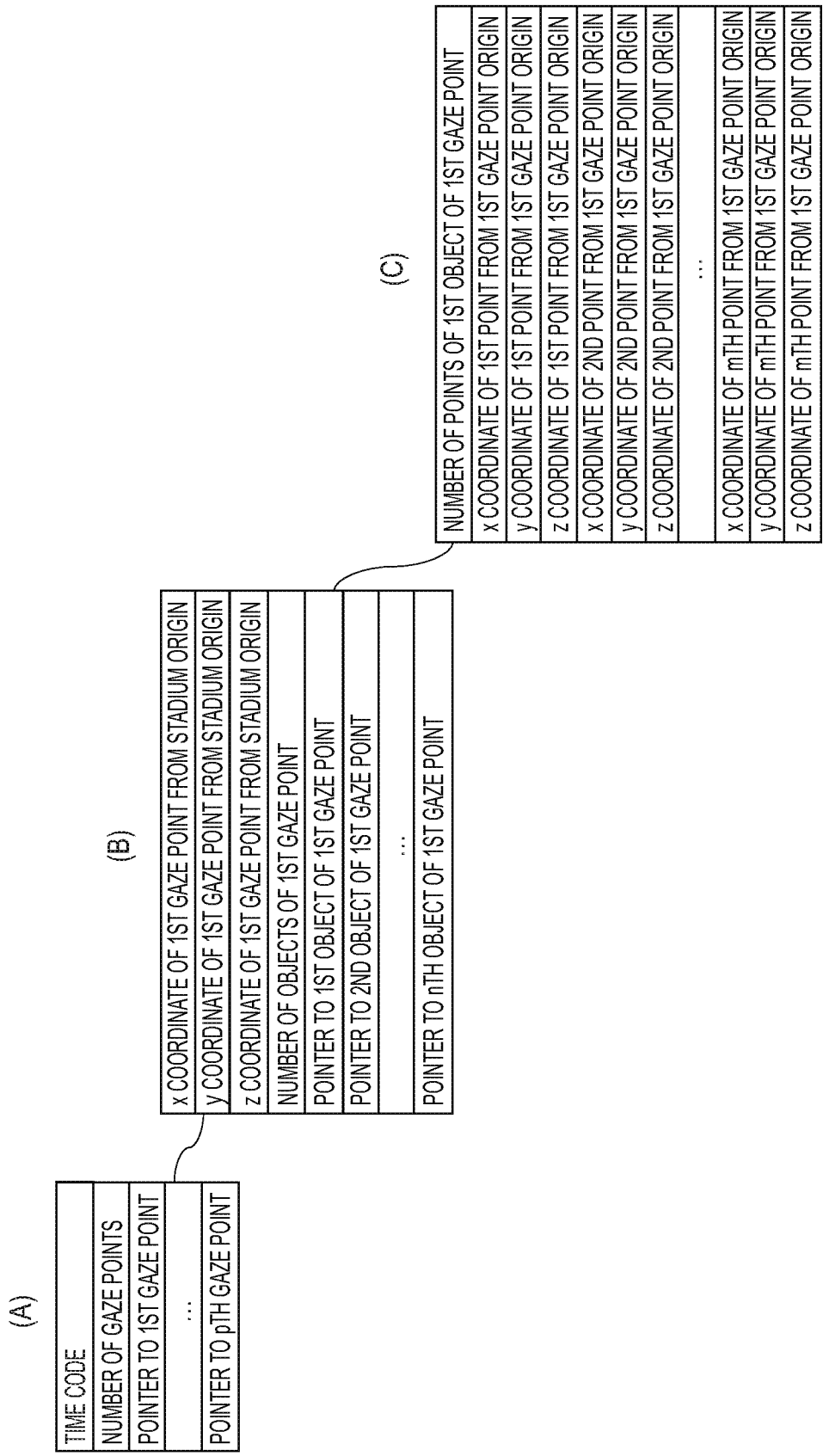
FIG. 4 is a diagram illustrating a constitution example of 3D model data in the first embodiment.

FIG. 4 illustrates a constitution example of the data of the 3D model in the first embodiment. As shown in (A) of FIG. 4 as an example, the data of the 3D model is managed at each time, a time code indicating the time has been given to the head of the data, and the number of gaze points is indicated subsequently as an integer. In the example of FIG. 2, since there are the three gaze points, the number of gaze points is three. Subsequently, a pointer to the first gaze point is designated. Here, it is assumed that the first gaze point is the gaze point 2000. As long as the same file, this pointer may be the data size to be skipped therefrom, or may be another file pointer.

As shown in (B) of FIG. 4 as an example, in the data designated by the pointer to the first gaze point, the position of the origin of the first gaze point is shown. The x-coordinate, the y-coordinate and the z-coordinate, i.e., the values of $(-d_{x0}, 0, 0)$, of the first gaze point from the origin of the stadium are described in order, and subsequently the number of objects included in the first gaze point is described. Thereafter, the pointer to each object is designated, and the point group of each object can be accessed by the pointer. As shown in (C) of FIG. 4 as an example, in the point group data of a first object, first the number of points constituting the first object is described, and the x coordinate, the y coordinate and the z coordinate of each point are described in order. Incidentally, data are similarly generated for other objects of the first gaze point. Similarly, data are generated for other gaze points.

Returning to FIG. 1, a back-end server 300 accepts designation of the virtual viewpoint from the virtual camera operation UI 330. The virtual camera operation UI 330 is an example of an information setting unit and an extracting unit. The back-end server 300 reads the corresponding foreground image, 3D model data and audio data from the database 250 based on the accepted virtual viewpoint, and performs a rendering process to generate the virtual viewpoint image. Here, the back-end server 300 generates the virtual viewpoint image for each gaze point. In the back-end server 300, a virtual viewpoint image generating unit 270 generates the virtual viewpoint image of the area 2100 corresponding to the gaze point 2000. Besides, a virtual viewpoint image generating unit 271 generates the virtual viewpoint image of the area 2101 corresponding to the gaze point 2001, and a virtual viewpoint image generating unit 272 generates the virtual viewpoint image of the area 2102 corresponding to the gaze point 2002. Besides, a virtual viewpoint background image generating unit 275 generates a background image from the virtual viewpoint. Here, the virtual viewpoint image generating units 270, 271 and 272 are examples of an image generating unit.

Figure 5:
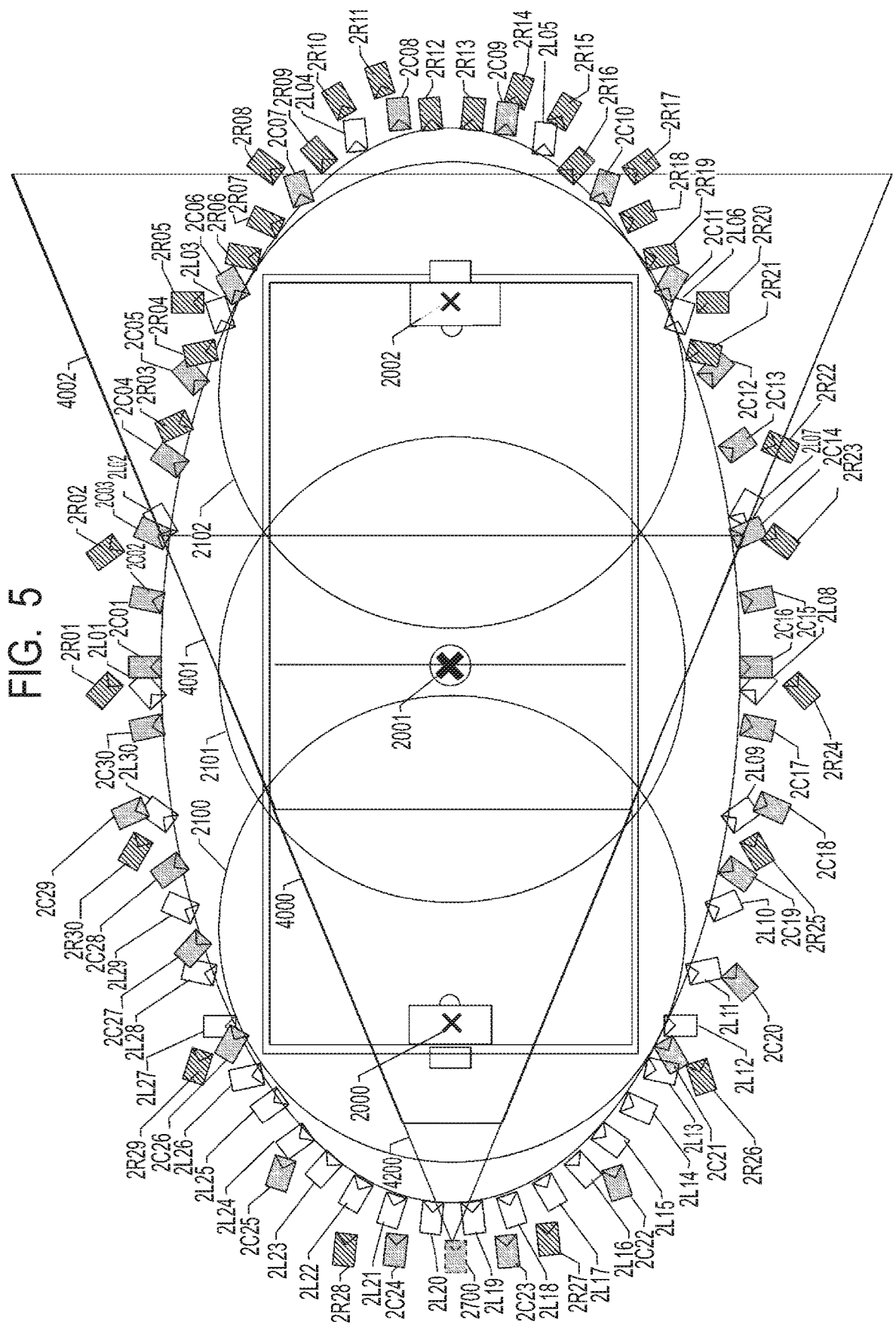
FIG. 5 is a diagram illustrating an example of the object capturing state in the first embodiment.

In case of generating the virtual viewpoint image, a not-illustrated user uses the virtual camera operation UI 330 to set the position, direction, angle of view and the like of the virtual camera indicating the virtual viewpoint in the virtual viewpoint image. Hereinafter, information such as the position, direction, angle of view and the like of the virtual camera is also referred to as virtual camera information. The virtual camera information set by the virtual camera operation UI 330 is output to the back-end server 300. Hereinafter, only the image will be described. For example, as illustrated in FIG. 5, it is assumed that a virtual camera 2700 is set between the sensor system 2L19 and the sensor system 2L20. In FIG. 5, the same constituent elements as those illustrated in FIG. 2 are denoted by the same reference numerals respectively. In FIG. 5, 4200 represents the angle of view of the virtual camera 2700.

The back-end server 300 inputs the virtual camera information to the database 250 in order to obtain an image necessary for generating the virtual viewpoint image seen from the virtual camera 2700. The database 250 retrieves and selects the foreground images captured by the respective sensor systems 2L01 to 2L30, 2C01 to 2C30, and 2R01 to 2R30, based on the input virtual camera information. Moreover, the database 250 retrieves and selects necessary data from the 3D models generated by the server front ends 230, 231 and 232, based on the input virtual camera information.

Besides, from the virtual camera information of the virtual camera 2700, the capturing range in the real space included in the angle of view 4200 is determined. Incidentally, the position information of the virtual camera is represented by the position where the gaze point 2001 is used as the origin of the world coordinates. It is determined whether or not each gaze point or each object is included in this capturing range, by comparing the position with the capturing range. In the example of FIG. 5, it is assumed that an area including capturing ranges 4000, 4001 and 4002 is the capturing range. Here, since the virtual viewpoint image in the capturing range 4000 includes the gaze point 2000, the virtual viewpoint image generating unit 270 generates the relevant virtual viewpoint image. Besides, since the virtual viewpoint image in the capturing range 4001 includes the gaze point 2001, the virtual viewpoint image generating unit 271 generates the relevant virtual viewpoint image. Besides, since the virtual viewpoint image in the capturing range 4002 includes the gaze point 2002, the virtual viewpoint image generating unit 272 generates the relevant virtual viewpoint image.

The image for generating the virtual viewpoint image of the angle of view 4200 is selected by specifying based on the virtual camera information the range captured by the virtual camera 2700. Besides, as illustrated in FIG. 5, the angle of view 4200 includes the areas 2100, 2101 and 2102, there is an overlapping portion between the areas 2101 and 2102, and there is an overlapping portion between the areas 2102 and 2103. When an object is included in these portions, it is determined whether to use the 3D model data from which gazing point or its foreground image. As for a method for determination, it is assumed that the 3D model data of the gaze point close to the position of each object and the foreground image are used. However, the present invention is not limited to this. For example, the 3D model data of the gaze point close to the virtual viewpoint and the foreground image may be used. That is, in case of generating the virtual viewpoint image related to the virtual camera 2700, for the object in the overlapping portion between the area 2100 and the area 2101, the virtual viewpoint image is generated using the 3D model data of the gaze point 2000 and the foreground image. Alternatively, in case of generating the virtual viewpoint image seen from the virtual camera 2700, the 3D model data of the gaze point that the number of cameras that captured the object is larger, and the foreground image may be employed. For example, a description will be given by taking an example of then object in the overlapping portion between the area 2100 and the area 2101. With regard to the gaze point 2000, the twelve sensor systems from the sensor system 2L14 to the sensor system 2L25 are capturing the object from the positions and angles of view of the sensor systems. With regard to the gaze point 2001, the ten sensor systems from the sensor system 2C19 to the sensor system 2L28 are capturing the object from the positions and angles of view of the sensor systems. Accordingly, in this case, since there are more sensor systems capturing the gaze point 2000, the virtual viewpoint image is generated using the 3D model data of the gaze point 2000 and the foreground image.

Figure 6:
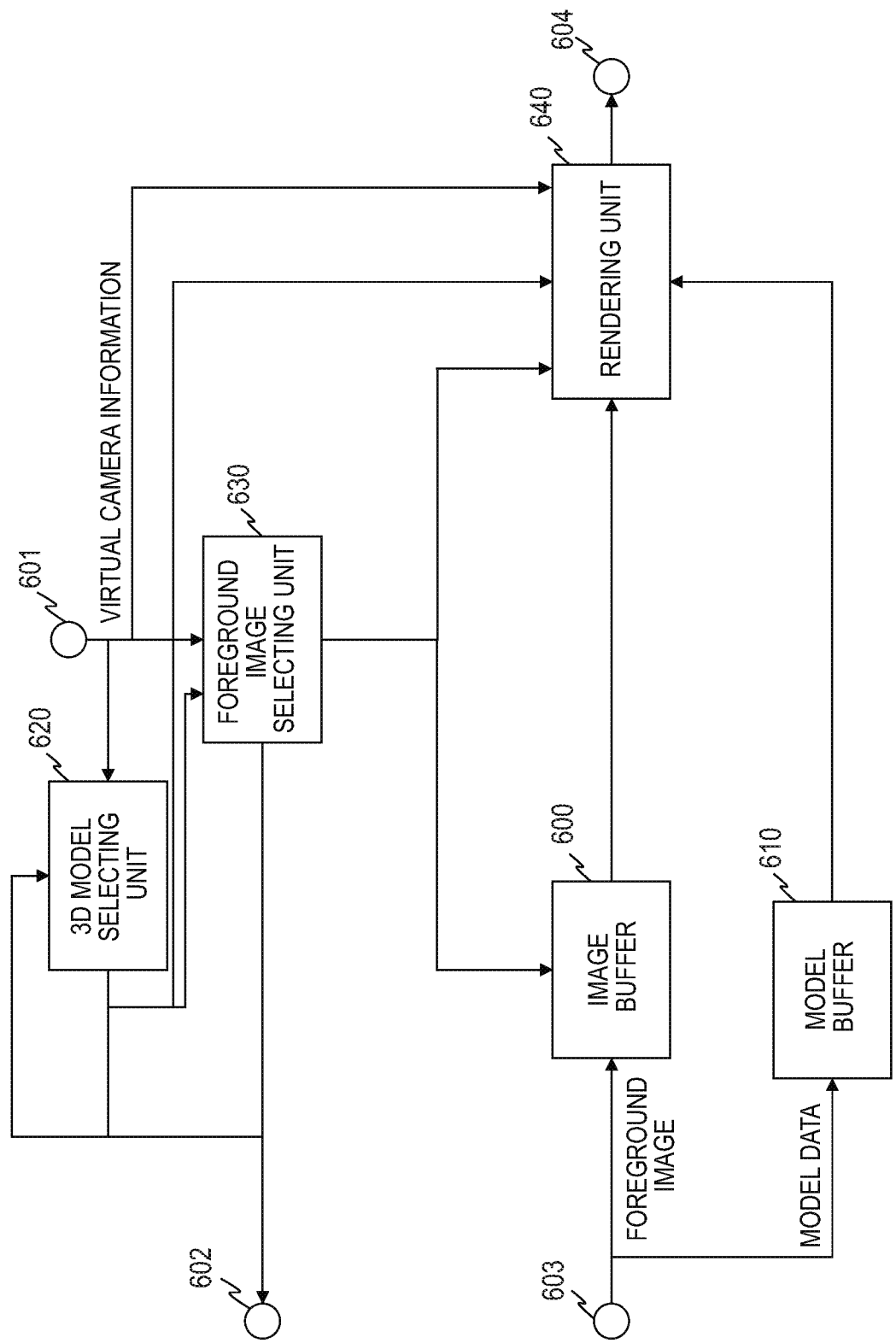
FIG. 6 is a diagram illustrating a constitution example of a virtual viewpoint image generating unit in the first embodiment.

Generation of the virtual viewpoint image related to the area 2100 in the virtual viewpoint image generating unit 270 will be described. FIG. 6 is a diagram illustrating a constitution example of the virtual viewpoint image generating unit 270. The virtual camera information and the information of the frame number for generating the virtual viewpoint image are input from the virtual viewpoint camera operation UI 330 to a terminal 601. A terminal 602 is connected to the database 250, reads the object position information list from the database 250, and further transmits a request for the foreground image and the 3D model data necessary for the image generation. Besides, foreground image data and the 3D model data read from the database 250 are input to a terminal 603. A terminal 604 outputs image data of an object such as a player or the like, the image data representing a generated virtual viewpoint camera image.

A 3D model selecting unit 620 designates the identifier of the 3D model data necessary for generating the object in the area. A foreground image selecting unit 630 determines the foreground image data necessary for texture mapping from the identifier of the 3D model data necessary for generating the object image, the angle of view of the virtual camera, and the camera position information. An image buffer 600 stores the foreground image input from the database 250. A model buffer 610 stores the 3D model data input from the database 250. A rendering unit 640 generates the virtual viewpoint image of the object from the input 3D model data and the foreground image.

Figure 7:
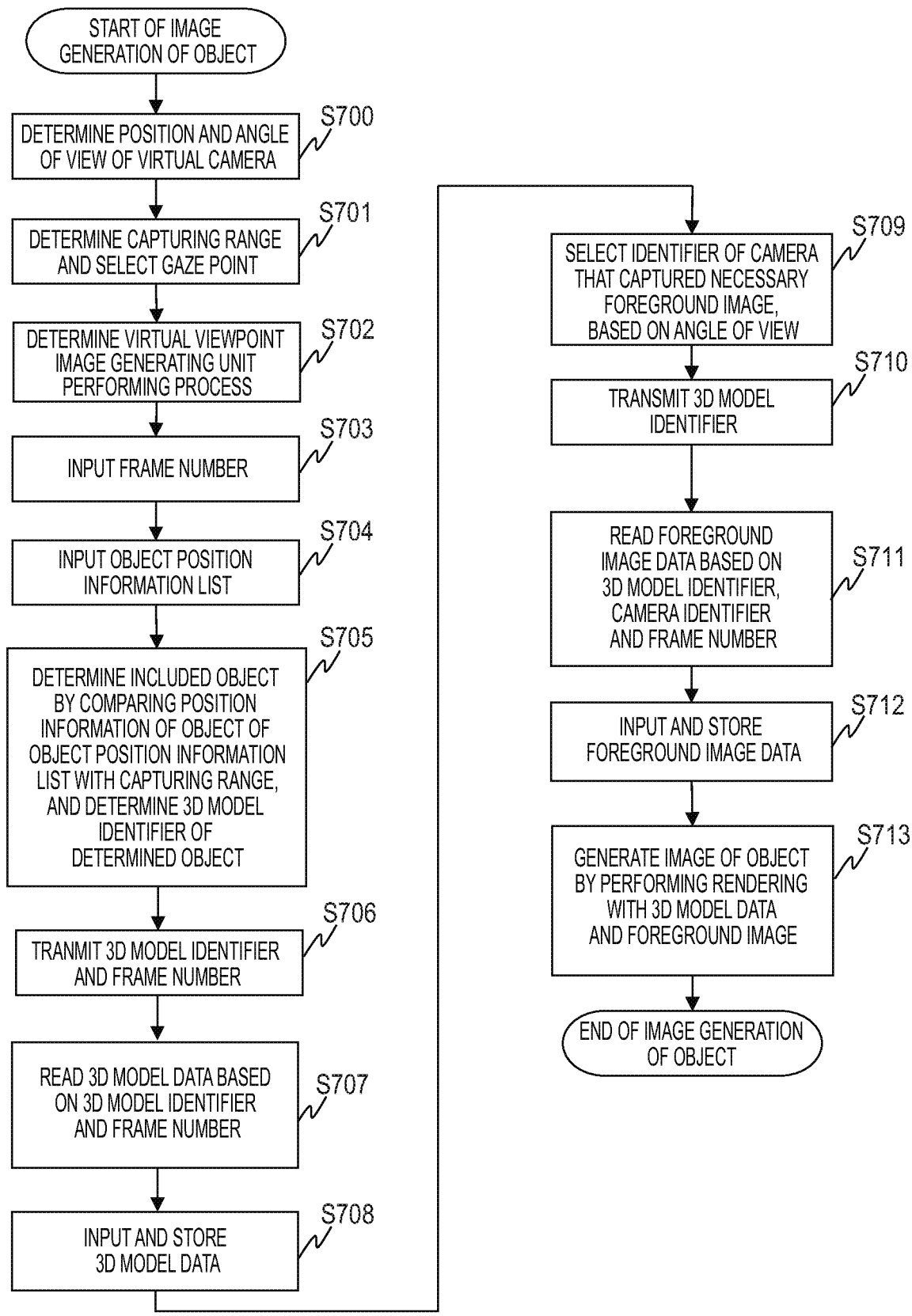
FIG. 7 is a flowchart for describing an example of a virtual viewpoint image generation operation in the first embodiment.

FIG. 7 is a flowchart for describing an example of the virtual viewpoint image generation operation in the first embodiment. In step S700, the virtual camera position, direction and angle of view are determined by the virtual camera operation UI 330 with a not-illustrated user. In step S701, the virtual camera operation UI 330 determines the capturing range based on the virtual camera information, and selects the gaze point included in the capturing range. By comparing the space indicated by the capturing range and the position of each gaze point in the world coordinates, it is determined whether or not the gaze point is included in the capturing range. In step S702, the back-end server 300 sets the virtual viewpoint image generating units 270 to 272 corresponding to the gaze point selected in step S701 to a processable state.

The subsequent process is the operation to be performed inside the selected virtual viewpoint image generating unit.

In step S703, the virtual camera information determined by the virtual camera operation UI 330 and the frame number of the frame for generating the virtual viewpoint image are input to the 3D model selecting unit 620, the foreground image selecting unit 630 and the rendering unit 640 via the terminal 601. In step S704, the 3D model selecting unit 620 requests the database 250 the object position information list of the input frame number via the terminal 602, and receives the requested object position information list. In step S705, the 3D model selecting unit 620 compares the position information in the object position information list obtained in step S704 with the capturing range, determines the object included in the capturing range, and determines its 3D model identifier.

In step S706, the 3D model selecting unit 620 transmits the 3D model identifier determined in step S705 and the frame number to the database 250 via the terminal 602, and requests data. In step S707, the database 250 reads the data of the 3D model based on the received 3D model identifier and frame number. In step S708, the 3D model data read in step S707, its 3D model identifier, and the frame number are stored in the model buffer 610 via the terminal 603.

In step S709, the foreground image selecting unit 630 selects the foreground image related to the surface of the model seen from the virtual viewpoint, based on the virtual camera information input from the terminal 601 and the 3D model identifier of the object transmitted from the 3D model selecting unit 620. Moreover, the foreground image selecting unit 630 selects the camera identifier that captured the selected foreground image. At this time, the camera that captured the surface that cannot be seen from the virtual viewpoint is not selected.

In step S710, the foreground image selecting unit 630 transmits the 3D model identifier, the selected camera identifier, and the frame number to the database 250 via the terminal 602, and requests the data. In step S711, the database 250 reads out the necessary foreground image data based on the received 3D model identifier, the camera identifier, and the frame number. In step S712, the foreground image data read in step S711, its 3D model identifier, the camera identifier, and the frame number are stored in the image buffer 600 via the terminal 603.

In step S713, the rendering unit 640 reads the 3D model data from the model buffer 610 based on the 3D model identifier and the frame number. Moreover, the rendering unit 640 reads the foreground image from the image buffer 600 based on the 3D model identifier, the camera identifier, and the frame number. Then, the rendering unit 640 texture-maps the foreground image on the 3D model data, and generates the image from the virtual viewpoint from the camera orientation, the angle of view, and the like of the virtual camera information input from the terminal 601. Moreover, the rendering unit calculates the image position information in the final image of the generated image. The generated virtual viewpoint image and image position information are output from the terminal 604.

Figure 8:
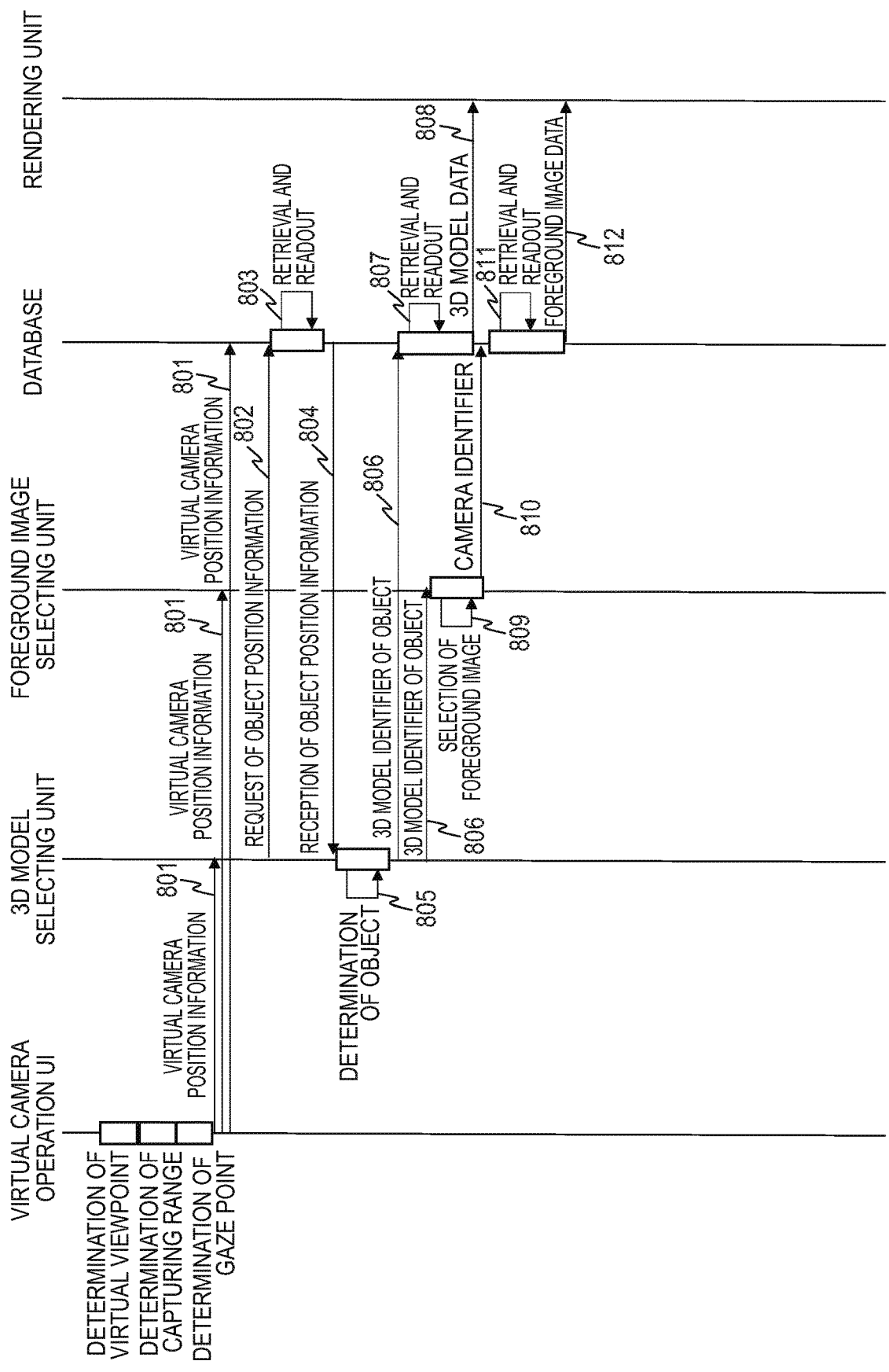
FIG. 8 is a sequence diagram illustrating a flow of virtual viewpoint image generation in the first embodiment.

FIG. 8 is a sequence diagram illustrating the flow of the generation of the virtual viewpoint image in the first embodiment. Initially, the virtual camera operation UI 330 determines the virtual camera position, direction and angle of view in accordance with the input by a not-illustrated user. The virtual camera operation UI 330 determines the capturing range based on the virtual camera information, and selects the gaze point included in the capturing range. The virtual viewpoint image generating units 270 to 272 corresponding to the gaze point selected by the virtual camera operation UI 330 are selected, and the virtual camera operation UI 330 sets the selected virtual viewpoint image generating unit to a state capable of starting a process. Then, the virtual camera operation UI 330 transmits the determined virtual camera information and the frame number of the frame for generating the virtual viewpoint image to the 3D model selecting unit 620, the foreground image selecting unit 630, and the rendering unit 640 (801).

The 3D model selecting unit 620 requests the database 250 the object position information list of the gaze point of the input frame number (802). The database 250 retrieves and reads the position information list of the corresponding frame number of the corresponding gaze point (803), and transmits the relevant list to the 3D model selecting unit 620 (804).

The 3D model selecting unit 620 compares the position information in the object position information list with the capturing range, determines the object included in the capturing range, and determines its 3D model identifier (805). After then, the 3D model selecting unit 620 transmits the 3D model identifier of the determined object and the frame number to the foreground image selecting unit 630 and the database 250 (806). The database 250 retrieves and reads the data of the 3D model based on the 3D model identifier and the frame number (807). Then, the database 250 transmits the read 3D model data, its 3D model identifier, and the frame number to the rendering unit 640 via the model buffer 610 (808).

Besides, the foreground image selecting unit 630 selects the foreground image related to the surface of the model seen from the virtual viewpoint, based on the virtual camera information transmitted from the virtual camera operation UI 330 and the 3D model identifier of the object transmitted from the 3D model selecting unit 620 (809). The foreground image selecting unit 630 selects the camera identifier that captured the selected foreground image. The foreground image selecting unit 630 transmits the 3D model identifier of the object, the selected camera identifier, and the frame number to the database 250 (810). The database 250 retrieves and reads the necessary foreground image data based on the 3D model identifier, the camera identifier, and the frame number (811). Then, the database 250 transmits the read foreground image data, its 3D model identifier, the camera identifier, and the frame number to the rendering unit 640 via the image buffer 600 (812).

The rendering unit 640 texture-maps the foreground image on the 3D model data, and generates the image from the virtual viewpoint from the camera orientation, the angle of view and the like of the virtual camera information input from the terminal 601. In this way, each of the virtual viewpoint image generating units 270, 271 and 272 generates the image from the virtual viewpoint for each gaze point.

Returning to FIG. 1, the images respectively generated by the virtual viewpoint image generating units 270 to 272 are input to a synthesizing unit 280. Besides, the virtual viewpoint background image generating unit 275 generates the background image from the virtual viewpoint using the background image data stored in the database 250, and inputs the generated background image to the synthesizing unit 280. More specifically, the virtual viewpoint background image generating unit 275 generates the background image from an actually captured image, CG (computer graphics) or the like based on the virtual camera position, angle of view and the like input from the virtual camera operation UI 330.

The synthesizing unit 280 synthesizes the background image generated by the virtual viewpoint background image generating unit 275 and the image data generated by each of the virtual viewpoint image generating units 270 to 272 in accordance with each capturing range. Hereinafter, image synthesis by the synthesizing unit 280 will be described with reference to FIGS. 9 to 11.

Figure 9:
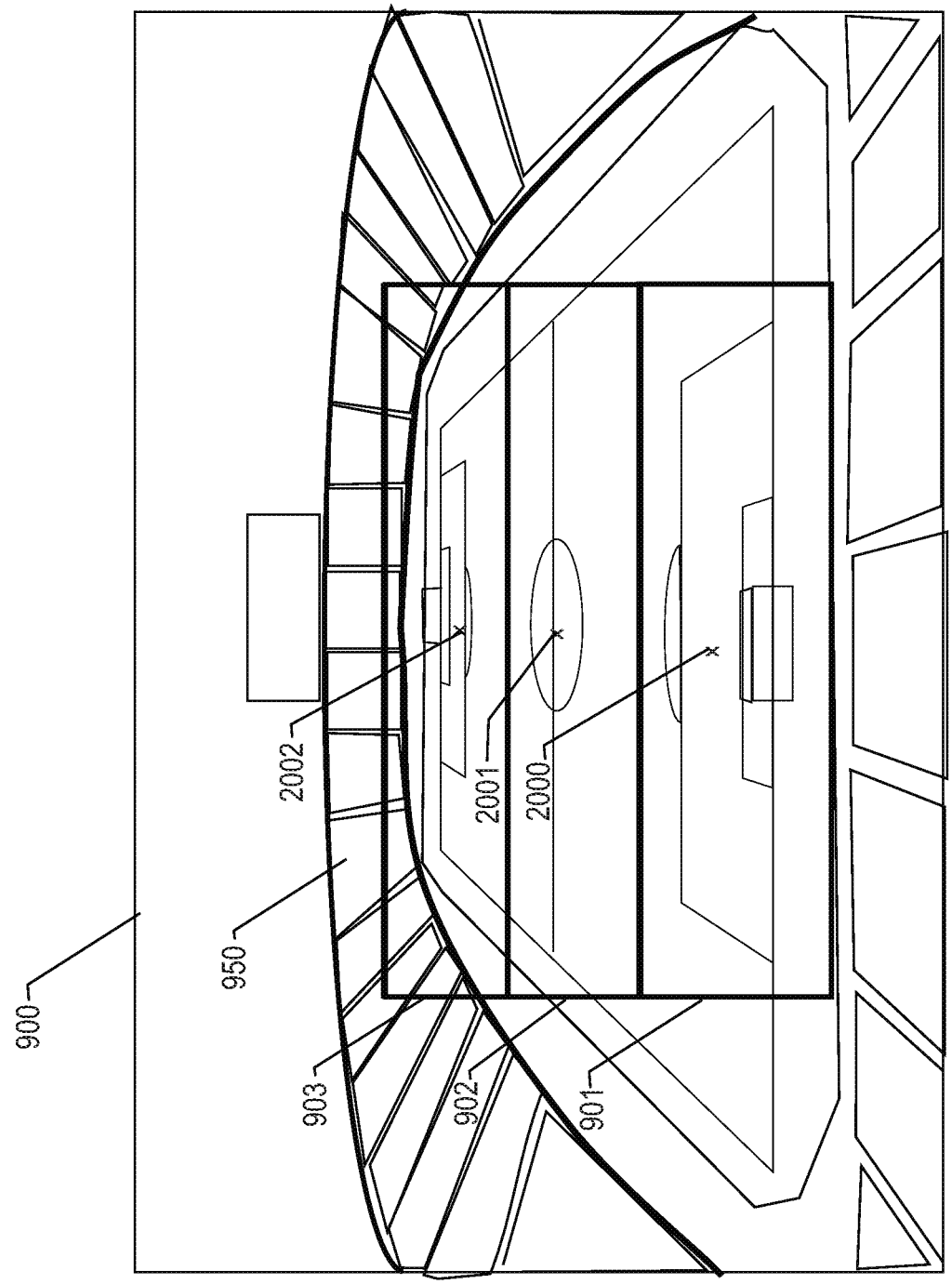
FIG. 9 is a diagram for describing an example of a background image.

FIG. 9 is a diagram illustrating an example of the background image generated by the virtual viewpoint background image generating unit 275. In FIG. 9, 900 indicates an entire background image, and 950 indicates a set angle of view. Besides, 901, 902 and 903 indicates capturing ranges to be handled at the gaze point. The capturing range 901 indicates the capturing range constituted by the cameras pointed to the gaze point 2000, the capturing range 902 indicates the capturing range constituted by the cameras pointed to the gaze point 2001, and the capturing range 903 indicates the capturing range constituted by the cameras pointed to the gaze point 2002.

Figure 10:
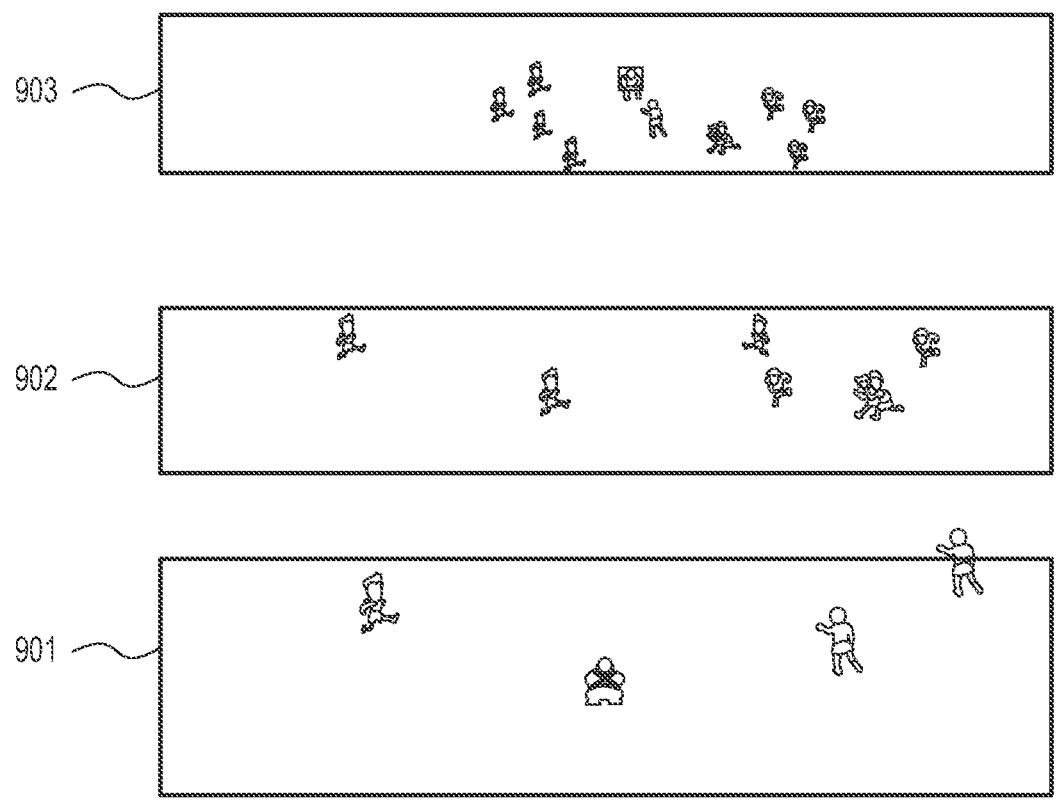
FIG. 10 is a diagram for describing an example of an object image.

FIG. 10 illustrates an example of the image generated by each of the virtual viewpoint image generating units 270 to 272. In the capturing range 903, the image in which the 3D model data is texture-mapped to the foreground image captured by the cameras that capture the gaze point 2002 is generated. In the capturing range 902, the image in which the 3D model data is texture-mapped to the foreground image captured by the cameras that capture the gaze point 2001 is generated. In the capturing range 901, the image in which the 3D model data is texture-mapped to the foreground image captured by the cameras that capture the gaze point 2000 is generated.

Figure 11:
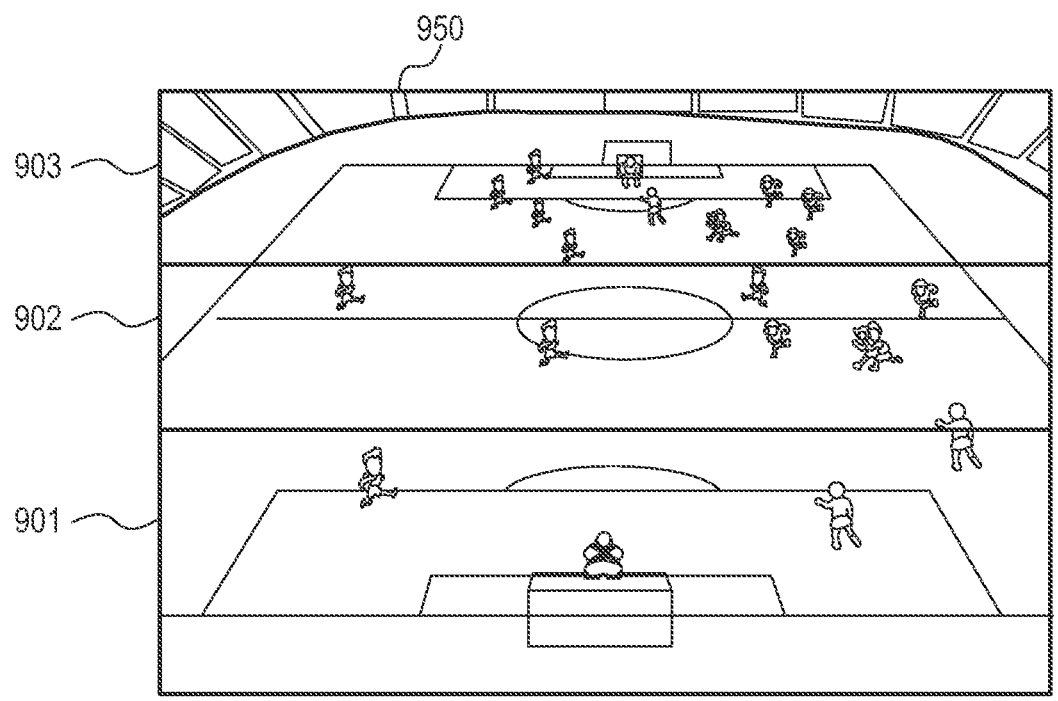
FIG. 11 is a diagram for describing an example of a synthesized image.

In case of the image synthesis, the synthesizing unit 280 performs the synthesis from the image of the distant gaze point. Thus, in a case where a distant object and a near object overlap each other, the distant object is naturally hidden by the near object. FIG. 11 illustrates the image that is synthesized with the background image. The synthesized image that has been synthesized as described above is transmitted to an output unit 285, and output to the outside.

As described above, according to the present embodiment, it is possible to generate a wide-area image from the virtual viewpoint without deteriorating quality in relation to the generation of the virtual viewpoint image. That is, since each object can be accurately modeled and the high-quality foreground image can be used, the quality of the entire virtual viewpoint image can be improved. For example, in case of trying to generate the image as illustrated in FIG. 11 only from the images captured by the cameras pointed to the gaze point 2001, the image quality of the players in the capturing range 902 is not different from that of the present invention. However, since the players in the capturing ranges 901 and 903 are out of focus, blurred images are given, so that is becomes impossible to perform accurate 3D model generation and high-quality texture mapping of the foreground image. On the other hand, in the present embodiment, such a deterioration of quality is prevented, and an inaccurate image that is more blurred than the distance in spite of being close to the virtual viewpoint is not provided.

In the present embodiment, the method of generating the virtual viewpoint image by generating the 3D model has been described using the MBR. However, the method is not particularly limited to this, and Image Based Rendering (IBR) that does not construct a 3D model, or another method may be used. Hereinafter, as an example, an example using the IBR will be described.

In FIG. 1, each of the server front ends 230, 231 and 232 cuts out the target such as a player or the like from the reconstructed frame data, and generates only the foreground image. Moreover, each of the server front ends 230, 231 and 232 writes the foreground image into the database 250 according to the camera identifier, the gaze point identifier, and the frame number. The back-end server 300 accepts designation of the virtual viewpoint from the virtual camera operation UI 330. Moreover, the back-end server 300 reads the corresponding foreground image and audio data from the database 250 based on the accepted virtual viewpoint, and performs a rendering process to generate the virtual viewpoint image. Moreover, the back-end server 300 generates the virtual viewpoint image for each gaze point. In case of generating the virtual viewpoint image, a not-illustrated user uses the virtual camera operation UI 330 to set the position, the direction, the angle of view, and the like of the virtual camera indicating the virtual viewpoint in the virtual viewpoint image.

Hereinafter, the virtual viewpoint image generating unit 270 will be described as an example. However, the same is applied to the virtual viewpoint image generating units 271 and 272. In order to obtain the image necessary for generating a virtual viewpoint image seen from the virtual camera 2700, the virtual camera information is input from the virtual camera operation UI 330 to the virtual viewpoint image generating unit 270. Based on the virtual camera information, necessary data is retrieved and selected from the foreground images respectively captured by the sensor systems 2L01 to 2L30, 2C01 to 2C30, and 2R01 to 2R30. The database 250 determines the capturing range in the real space included in the angle of view 4200 from the virtual camera information of the virtual camera 2700. Incidentally, the position information of the virtual camera is represented by the position where the gaze point 2001 is used as the origin of the world coordinates.

Figure 12:
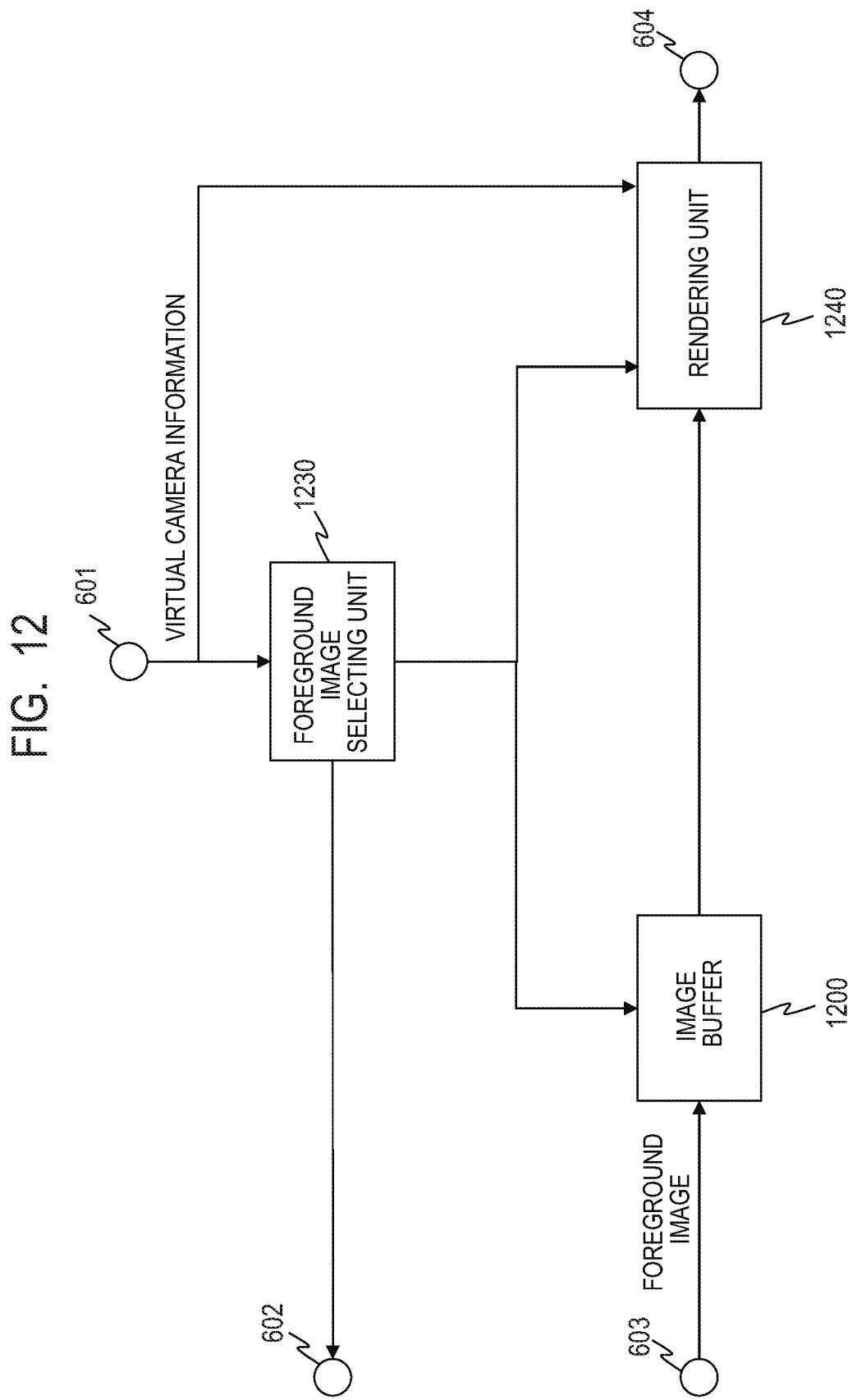
FIG. 12 is a diagram illustrating another constitution example of the virtual viewpoint image generating unit in the first embodiment.

As well as the above-described embodiment, generation of the virtual viewpoint image related to the area 2100 in the virtual viewpoint image generating unit 270 will be described. FIG. 12 is a diagram illustrating another constitution example of the virtual viewpoint image generating unit 270. In FIG. 12, the constituent elements having the same functions as those of the constituent elements illustrated in FIG. 6 are denoted by the same reference numerals respectively, and redundant descriptions are omitted. A foreground image selecting unit 1230 selects the camera necessary to generate an image of the object from the angle of view of the virtual camera and the camera position information, and determines necessary data of the foreground image. An image buffer 1200 stores the foreground image input from the database 250. A rendering unit 1240 generates the virtual viewpoint image of the object from the input foreground image. The foreground image selecting unit 1230 stores in advance the position information of the cameras capturing the respective gaze points. Incidentally, the position information of the camera may be read from the outside.

The method of the IBR is not particularly limited. For example, an image is generated based on the images from the two cameras. The foreground image selecting unit 1230 selects the two nearest cameras from the position of the virtual viewpoint camera. In the virtual viewpoint image generating unit 270, the foreground images of the cameras of the sensor system 2L19 and the sensor system 2L20 are selected for the virtual viewpoint camera 2700 illustrated in FIG. 5. Similarly, in the foreground image selecting unit 1230 of the virtual viewpoint image generating unit 271, the sensor system 2C23 and the sensor system 2C24 are selected. Moreover, in the foreground image selecting unit 1230 of the virtual viewpoint image generating unit 272, the sensor system 2R27 and the sensor system 2R28 are selected.

The foreground image selecting unit 1230 transmits the corresponding frame number and the identifier of the camera of each sensor system to the database 250 via the terminal 602, and requests data. The database 250 reads the necessary foreground image data based on the received frame number and camera identifier. The read foreground image data, its frame number, and the camera identifier are stored in the image buffer 1200 via the terminal 603. The rendering unit 1240 reads the foreground image from the image buffer 1200 based on the camera identifier and the frame number. From the foreground images of the two cameras, the rendering unit 1240 generates an image from the virtual viewpoint using a technique such as morphing or the like. Moreover, the rendering unit calculates the image position information in the final image of the generated image. The generated virtual viewpoint image and image position information are output from the terminal 604.

As just described, in relation to generation of the virtual viewpoint image, it is possible to generate a wide-area image from the virtual viewpoint without deteriorating quality even by the IBR that does not use a 3D model. That is, in the present embodiment, since the high-quality foreground image can be used for each virtual viewpoint camera, it is possible to improve the quality of the entire virtual viewpoint image.

Incidentally, it should be noted that the above-described image processing system 100 in the present embodiment is not limited to the above-explained physical constitution, and this system may be logically constituted. Besides, although the sensor groups 200, 201 and 202 are connected to the switching hub 180, the present invention is not limited to this. It is of course possible to perform a cascade connection for these sensor groups. Besides, although the example in which the plurality of virtual viewpoint image generating units are used has been described, the present invention is not limited to this. Namely, the present embodiment may be achieved by a time-division system or parallel processes in a plurality of threads, using one virtual viewpoint image generating unit.

Incidentally, in the above embodiment, although the difference of the position information between the gaze points has been described, the present invention is not limited to this. Of course, the camera position, the gaze point position and the like may be calculated using the world coordinates that are based on one origin. That is, in (C) of FIG. 4, as the information of each point group, it may be possible to store information obtained by adding, to the coordinates of each point, not the coordinates from each gaze point origin but the coordinates of the gaze point from the stadium origin. Incidentally, in the present embodiment, since the gaze point is fixed, it is also possible to store the position information of the gaze point as a list in the database 250, or store the position information of the gaze point as a fixed value in the server front ends 230 to 232 and the back-end server 300.

Moreover, in the above-described embodiment, it is possible to perform the rendering with the resolution of the object included in the gaze point far from the virtual camera being lower than the resolution of the object included in the gaze point close to the virtual camera. That is, since a distant object becomes small at the time of synthesizing, it becomes possible to perform a high-speed process by suppressing the original resolution. Thus, in the IBR, by lowering the resolution of the 3D model of the object included in the distant gaze point, it becomes possible to perform high-speed model generation and rendering. Incidentally, although the above embodiment has been described using the stadium of soccer or the like, as an example, the present invention is not limited to this. For example, it may be a game such as baseball, basketball, skating or the like, or it may be a stage or a movie set.

Second Embodiment

Next, a second embodiment of the present invention will be described.

Figure 13:
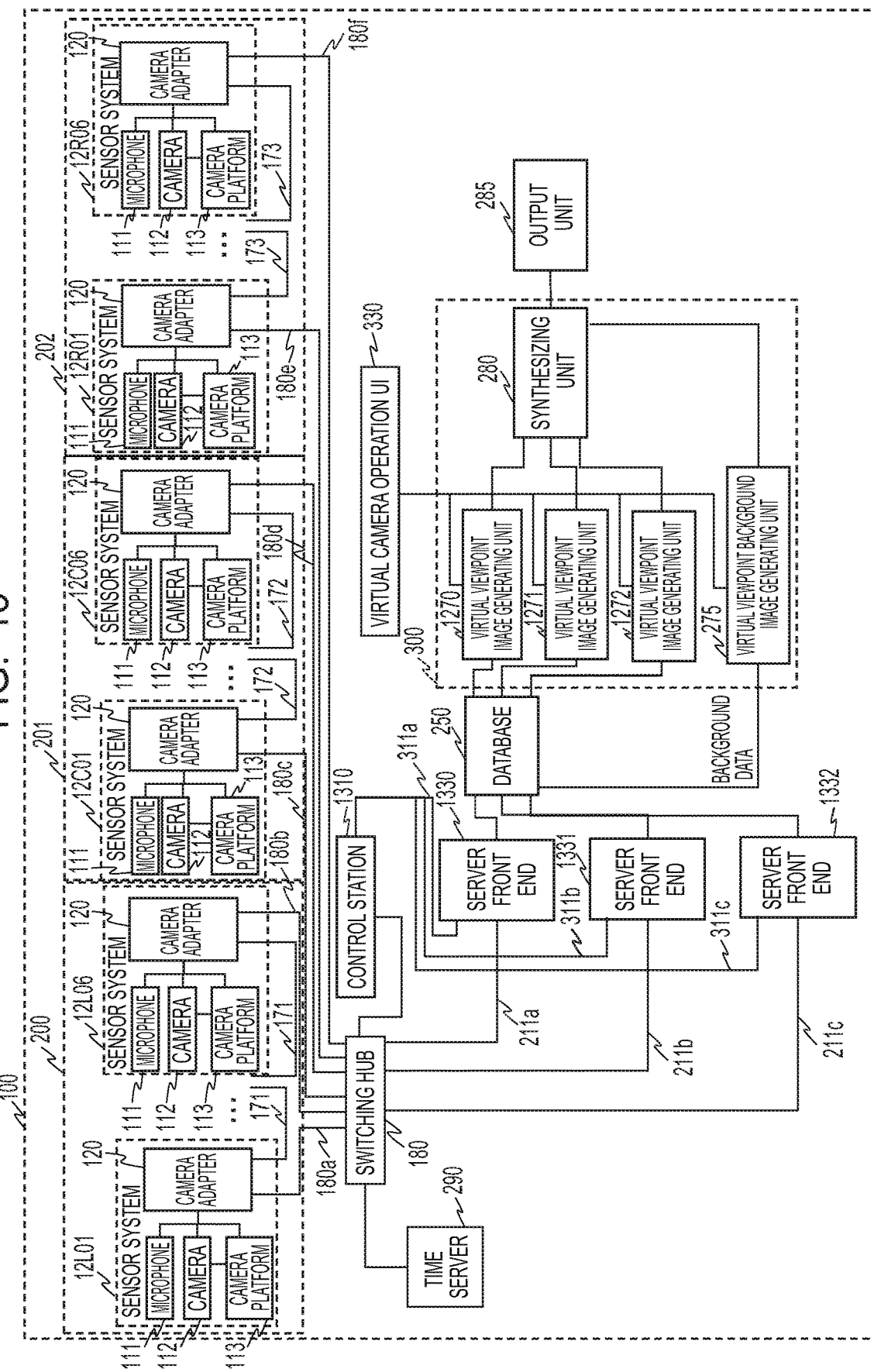
FIG. 13 is a diagram illustrating a constitution example of an image processing system in a second embodiment.

FIG. 13 is a diagram illustrating a constitution example of the image processing system 100 according to the second embodiment. In FIG. 13, the constituent elements having the same functions as those of the constituent elements illustrated in FIG. 1 are denoted by the same reference numerals respectively, and redundant descriptions are omitted. Server front ends 1330, 1331 and 1332 process data obtained from the sensor systems. The server front ends 1330 to 1332 are different from the server front ends 230 to 232 in the first embodiment in the point of obtaining the position information of each gaze point from a control station 1310 and giving the position information from the stadium origin to each data.

Figure 14:
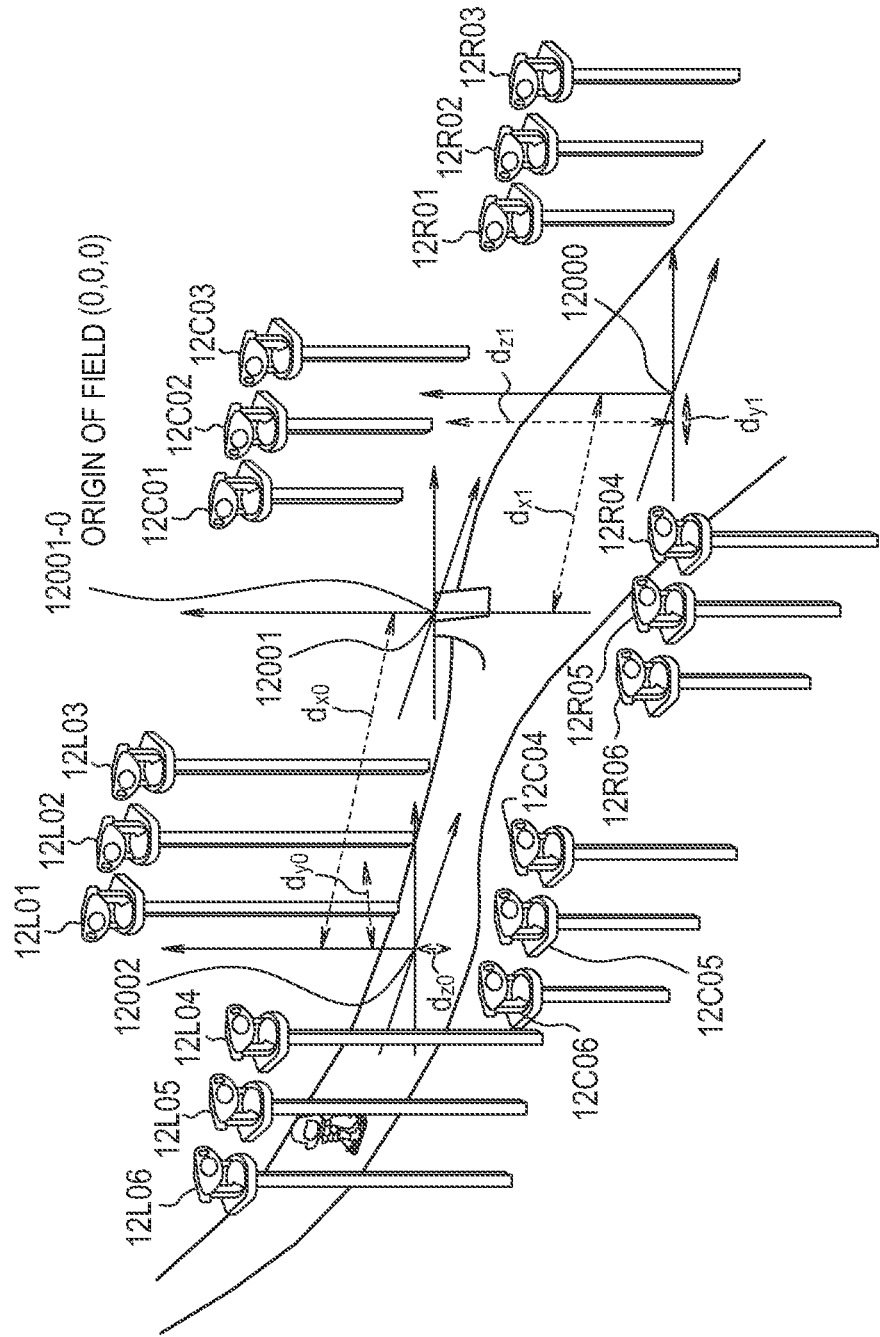
FIG. 14 is a diagram illustrating an example of an object capturing state in the second embodiment.

FIG. 14 illustrates an example of gaze points of the stadium in the second embodiment. In the present embodiment, ski aerials will be described as an example. Although the description will be made assuming that there are the three gaze points also in the present embodiment, the present invention is not limited to this. It is assumed that gaze points 12000, 12001 and 12002 represent the gaze points at the start of capturing, and a gaze point 12001 is an origin 12001-0 of the field. The sensor systems 12L01 to 12L06 correspond to the gaze point 12002, and each of the sensor systems has one camera 112 and one camera platform 113. The sensor systems 12C01 to 12C06 correspond to the gaze point 12001, and each of the sensor system has one camera 112 and one camera platform 113. The sensor systems 12R01 to 12R06 correspond to the gaze point 12002, and each of the sensor systems has one camera 112 and one camera platform 113. Although an example in which the six sensor systems are used for each gaze point is described in the present embodiment, the present invention is not limited to this.

Figure 15:
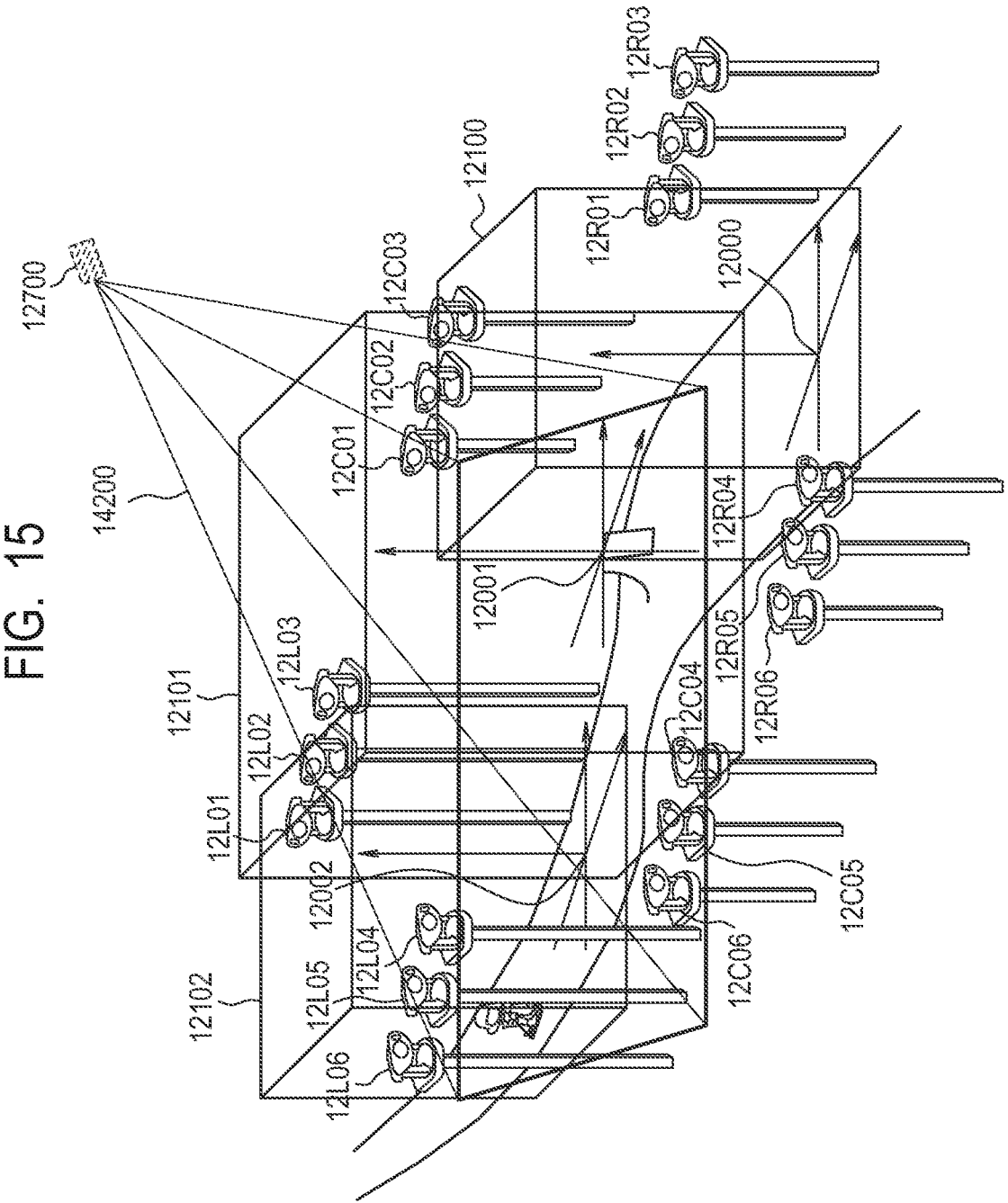
FIG. 15 is a diagram illustrating an example of the object capturing state in the second embodiment.

FIG. 15 illustrates a capturing range of each gaze point. The cameras 112 of the sensor systems 12R01 to 12R06 corresponding to the gaze point 12000 capture the range of an area 12100. The cameras 112 of the sensor systems 12C01 to 12C06 corresponding to the gaze point 12001 capture the range of an area 12101, and the cameras 112 of the sensor systems 12L01 to 12L06 corresponding to the gaze point 12002 capture the range of an area 12102. Here, as illustrated in FIG. 14, the gaze point 12001 is the origin of the field, and its coordinates are (0, 0, 0). The gaze point 12000 is $(d_{x1}, d_{y1}, -d_{z1})$ in the field coordinates, and the gaze point 12002 is $(-d_{x0}, -d_{y0}, d_{z0})$ in the field coordinates.

The sound collected by the microphone 111 of the sensor system 12L01 and the image captured by the camera 112 are subjected to an image process by the camera adapter 120, and then transmitted to the camera adapter 120 of the sensor system 12L02 via the network 171. Similarly, the sensor system 12L02 combines the collected sound, the captured image and the image and sound data obtained from the sensor system 12L01 together, and transmits the obtained data to the sensor system 12L03 via the network 171. By continuing the above operation, the images and sounds obtained by the sensor systems 12L01 to 12L06 are transmitted from the sensor system 12L06 to the server front end 1330 via the networks 180b and 211a and the switching hub 180.

The control station 1310 can move the gaze point by controlling the camera platform 113 at the capture or between the captures and thus moving the direction of the camera 112. A case where the control station 1310 sets a new gaze point using the camera platform 113 will be described. For example, in case of moving the gaze point 12002 by $(s_{x1}, s_{y1}, s_{z1})$, the control station 1310 controls the camera platform 113 of each of the sensor systems 12L01 to 12L06, and points the camera 112 to the intended direction, thereby controlling the focus and angle of view. Then, the information related to the change of the position of the gaze point is input to the server front end 1330 via a network 311a.

Similarly, in case of moving the gaze point 12001, the control station 1310 controls the camera platform 113 of each of the sensor systems 12C01 to 12C06, and points the camera 112 to the intended direction, thereby controlling the focus and angle of view. Then, the information related to the change of the position of the gaze point is input to the server front end 1331 via a network 311b. Besides, in case of moving the gaze point 12000, the control station 1310 controls the camera platform 113 of each of the sensor systems 12R01 to 12R06, and points the camera 112 to the intended direction, thereby controlling the focus and angle of view. Then, the information related to the change of the position of the gaze point is input to the server front end 1332 via a network 311c.

In the present embodiment, the server front end 1330 reconstructs a segmented transmission packet from the image and sound obtained from the sensor system 12L06, and converts a data format of frame data. Moreover, as well as the server front end 230 in the first embodiment, the server front end 1330 cuts out a target (object) such as a player or the like from the reconstructed frame data, and generates a 3D model of the object from the images of all the cameras using the cut-out result as the foreground image. Here, as well as the first embodiment, it is assumed that the generated 3D model is expressed as a point group. The server front end 1330 gives an identifier for identifying the 3D model to the relevant 3D model, and writes the obtained data into the database 250 according to a frame number together with point group data of the 3D model.

FIG. 16 illustrates a constitution example of the data of the 3D model in the second embodiment. As shown in (A) of FIG. 16 as an example, the data of the 3D model is managed at each time, a time code indicating the time has been given to the head of the data, and the number of gaze points is indicated subsequently as an integer. In the example of FIG. 14, since there are the three gaze points, the number of gaze points is three. Subsequently, a pointer to the first gaze point is designated. Here, it is assumed that the first gaze point is the gaze point 12002. As long as the same file, this pointer may be the data size to be skipped therefrom, or may be another file pointer.

As shown in (B) of FIG. 16 as an example, in the data designated by the pointer to the first gaze point, the position of the origin of the first gaze point is shown. The x-coordinate, the y-coordinate and the z-coordinate, i.e., the values of $(-d_{x0}, -d_{y0}, d_{z0})$, of the first gaze point from the origin of the field are described in order, and subsequently the number of objects included in the first gaze point is described. Thereafter, the pointer to each object is designated, and the point group of each object can be accessed by the pointer. Moreover, the number of points constituting the first object is subsequently described. The data amount of the 3D data of the first object can be calculated from the data length of the data representing the coordinates, and the number of points, so that it is possible to obtain the data in a lump.

As shown in (C) of FIG. 16 as an example, in the point group data of the first object, the x coordinate, the y coordinate and the z coordinate of the origin of the circumscribed cube of the first object are described. Subsequently, the size in the x-axis direction (x size), the size in the y-axis direction (y size) and the size in the z-axis direction (z size) are described, and these sizes represent the size of the circumscribed cube of the first object. Subsequently, the x-coordinate, the y-coordinate and the z-coordinate of each point are described in order. Similarly, data are generated for other objects of the first gaze point. Similarly, data is generated for other gaze points.

Figure 17A:
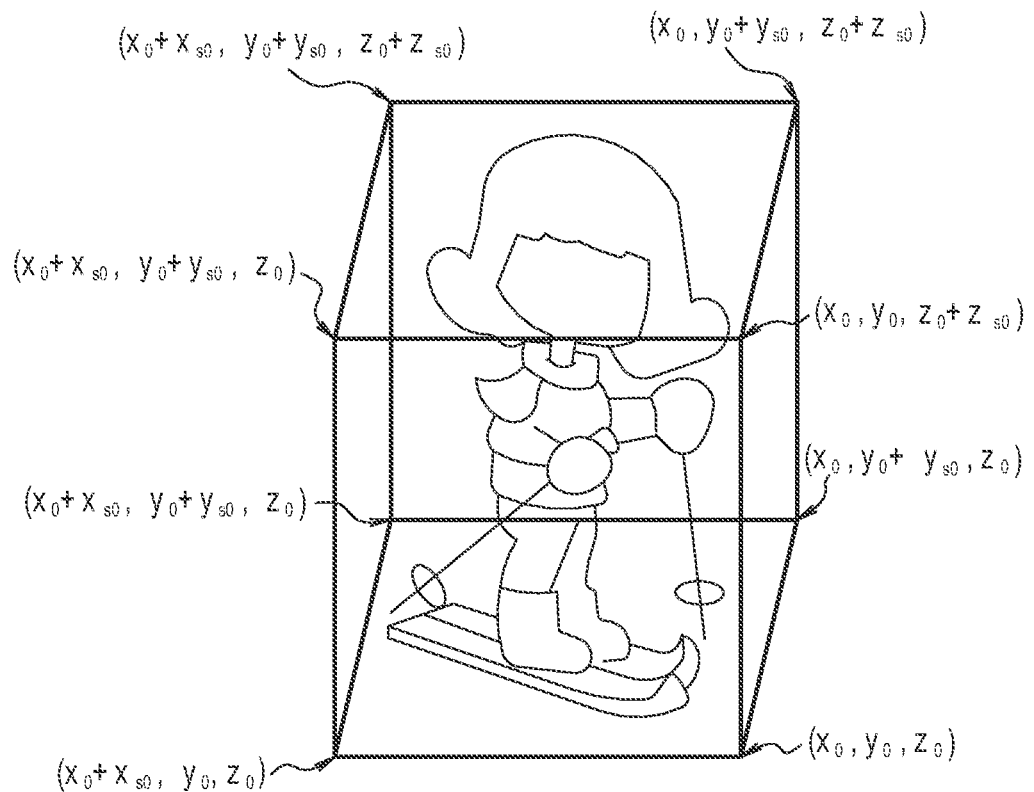
FIG. 17A is a diagram illustrating an example of a point group of the 3D model data in the second embodiment.
Figure 17B:
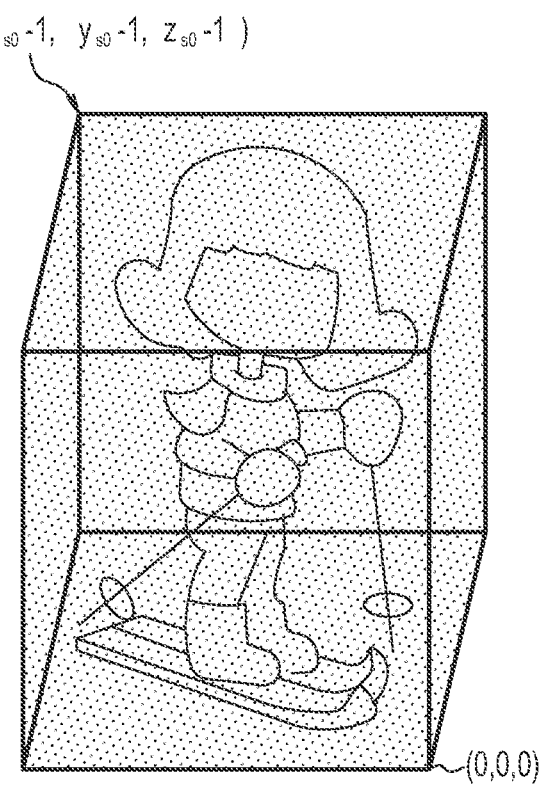
FIG. 17B is a diagram illustrating an example of the point group of the 3D model data in the second embodiment.

Here, a circumscribed cube including the first object is assumed. Aspects of this circumscribed cube are illustrated in FIGS. 17A and 17B. The position in the case where the origin of the circumscribed cube is the origin of gaze point is described as the circumscribed cube origin coordinates of the first object. In the present embodiment, as illustrated in FIG. 17A, it is assumed that the coordinate positions with the gaze point as the origin are $x_0$, $y_0$ and $z_0$. Besides, as illustrated in FIG. 17B, it is assumed that the size of the circumscribed cube is represented by $x_{s0}$, $y_{s0}$ and $z_{s0}$. In the following, the x coordinate, the y coordinate and the z coordinate of each point constituting the first object are described in order as the relative positions from the origin of the circumscribed cube.

As well as the first embodiment, the back-end server 300 reads the 3D model data and the foreground image from the database 250, and performs a rendering process to generate the virtual viewpoint image. Here, the back-end server 300 generates a virtual viewpoint image for each gaze point.

In case of generating the virtual viewpoint image, a not-illustrated user uses the virtual camera operation UI 330 to generate virtual camera information. The back-end server 300 inputs the virtual camera information to the database 250 in order to obtain an image necessary for generating the virtual viewpoint image seen from a virtual camera 12700 illustrated in FIG. 15. The database 250 retrieves and selects the foreground images captured by the respective sensor systems 12L01 to 12L06, 12C01 to 12C06, and 12R01 to 12R06, based on the input virtual camera information. Moreover, the database 250 retrieves and selects necessary data from the 3D models generated by the server front ends 1330, 1331 and 1332, based on the input virtual camera information.

Besides, from the virtual camera information of the virtual camera 12700, the capturing range in the real space included in an angle of view 14200 is determined. Incidentally, the position information of the virtual camera is represented by the position where the gaze point 12001 is used as the origin of the world coordinates. In the present embodiment, since the gaze point moves, whether or not the gaze point is included in the angle of view is decided by the coordinates of each gaze point from the origin of the field and whether or not its area is included in the angle of view, as shown in (B) of FIG. 16. Besides, whether or not each gaze point or each object is included in the capturing range is determined by a comparison between its position and the capturing range. In this case, initially, in order to represent the object with the circumscribed cube, the database 250 first decides whether or not the circumscribed cube is included in the field of view from the virtual viewpoint 12700. This can be decided by whether or not the points of the corners of the circumscribed cube are included in the angle of view.

In the example of FIG. 15, since the virtual viewpoint image includes the gaze point 12002, a virtual viewpoint image generating unit 1272 generates the virtual viewpoint image. Moreover, since the virtual viewpoint image includes the gaze point 12001, a virtual viewpoint image generating unit 1271 generates the virtual viewpoint image. Incidentally, since the virtual viewpoint image does not include the gaze point 12000, a virtual viewpoint image generating unit 1270 does not operate.

The generation of the virtual viewpoint image related to the area 12102 in the virtual viewpoint image generating unit 1272 will be described. Since the constitution of the virtual viewpoint image generating unit 1272 is the same as the constitution of the virtual viewpoint image generating unit 270 in the first embodiment, a description thereof will be omitted. Moreover, the virtual viewpoint image generation operation in the present embodiment is the same as that in the first embodiment shown in the flowchart of FIG. 7. However, in the present embodiment, since the gaze point moves, it is necessary in step S701 to read and compare the information of the gaze point position from the 3D model data in the database 250. Besides, in step S705, each point of the circumscribed cube is referred to as the position information of the object.

Figure 18:
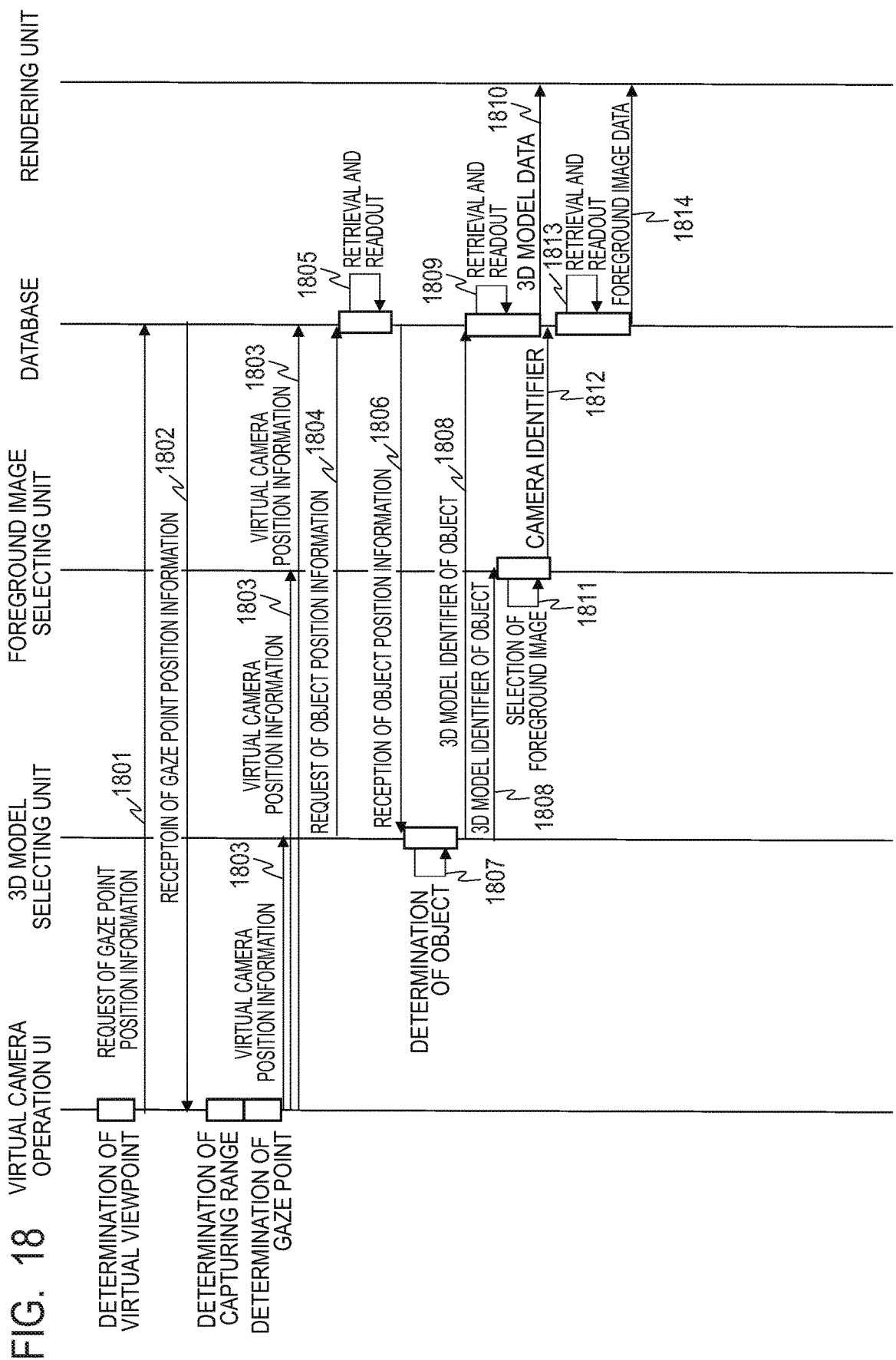
FIG. 18 is a sequence diagram illustrating a flow of virtual viewpoint image generation in the second embodiment.

FIG. 18 is a sequence diagram illustrating the flow of the generation of the virtual viewpoint image in the second embodiment. Initially, the virtual camera operation UI 330 determines the virtual camera position, direction and angle of view in accordance with the input by a not-illustrated user. The virtual camera operation UI 330 transmits the time of frame for image generation to the database 250 and requests the gaze point position information at that time (1801). The database 250 transmits the position information of each gaze point to the virtual camera operation UI 330 (1802). The virtual camera operation UI 330 determines the capturing range based on the virtual camera information and the gaze point position information, and selects the gaze point included in the capturing range. The virtual viewpoint image generating units 1270 to 1272 corresponding to the gaze point selected by the virtual camera operation UI 330 are selected, and the virtual camera operation UI 330 sets the selected virtual viewpoint image generating unit to a state capable of starting a process. Then, the virtual camera operation UI 330 transmits the determined virtual camera information and the frame number of the frame for generating the virtual viewpoint image to the 3D model selecting unit 620, the foreground image selecting unit 630, and the rendering unit 640 (1803).

The 3D model selecting unit 620 requests the database 250 the object position information list of the gaze point of the input frame number (1804). The database 250 retrieves and reads the position information list of the corresponding frame number of the corresponding gaze point (1805), and transmits the relevant list to the 3D model selecting unit 620 (1806).

The 3D model selecting unit 620 compares the position information in the object position information list with the capturing range, determines the object included in the capturing range, and determines its 3D model identifier (1807). After then, the 3D model selecting unit 620 transmits the 3D model identifier of the determined object and the frame number to the foreground image selecting unit 630 and the database 250 (1808). The database 250 retrieves and reads the data of the 3D model based on the 3D model identifier and the frame number (1809). Then, the database 250 transmits the read 3D model data, its 3D model identifier, and the frame number to the rendering unit 640 via the model buffer 610 (1810).

Besides, the foreground image selecting unit 630 selects the foreground image related to the surface of the model seen from the virtual viewpoint, based on the virtual camera information transmitted from the virtual camera operation UI 330 and the 3D model identifier of the object transmitted from the 3D model selecting unit 620 (1811). The foreground image selecting unit 630 selects the camera identifier that captured the selected foreground image. The foreground image selecting unit 630 transmits the 3D model identifier of the object, the selected camera identifier, and the frame number to the database 250 (1812). The database 250 retrieves and reads the necessary foreground image data based on the 3D model identifier, the camera identifier, and the frame number (1813). Then, the database 250 transmits the read foreground image data, its 3D model identifier, the camera identifier, and the frame number to the rendering unit 640 via the image buffer 600 (1814).

The rendering unit 640 texture-maps the foreground image on the 3D model data, and generates the image from the virtual viewpoint from the camera orientation, the angle of view and the like of the virtual camera information input from the terminal 601. In this way, the virtual viewpoint image generating unit that generates the virtual viewpoint image among the virtual viewpoint image generating units 1270, 1271 and 1272 generates the image from the virtual viewpoint for each gaze point.

As well as the first embodiment, the synthesizing unit 280 synthesizes the background image generated by the virtual viewpoint background image generating unit 275 and the image data generated by each of the virtual viewpoint image generating units 1270 to 1272 in accordance with each capturing range.

As described above, according to the present embodiment, in relation to the generation of the virtual viewpoint image, it is possible to prevent a deterioration of quality, and to generate a wide-area image from the virtual viewpoint without providing an inaccurate image that is more blurred than the distance in spite of being close to the virtual viewpoint. That is, since each object can be accurately modeled and the high-quality foreground image can be used, it is possible to improve the quality of the entire virtual viewpoint image. In addition, it is possible to track a moving object, thereby always allowing to set the object as the gaze point. As a result, since the object can always be captured with the best focus, it is possible to generate an accurate object, and it is also possible to obtain a high-quality image even in case of generating the virtual viewpoint image at long range.

In the present embodiment, although the position information of the gaze point is included in the 3D model data and recorded, the present invention is not limited to this. The position information of the gaze point may separately be listed in the database 250 in association with the frame number. Besides, although the above embodiment has been described using the difference of the position information between the gaze points, the present invention is not limited to this. Of course, the camera position, the gaze point position, and the like may be calculated using the world coordinates based on one origin. That is, in FIG. 14, it may be possible to store the information of each point group obtained by adding, to the coordinates of each point, not the coordinates from each circumscribed cube origin but the coordinates from the gaze point origin. Moreover, in FIG. 14, it may be possible to store the information of each point group obtained by adding, to the coordinates of each point, not the coordinates from each circumscribed cube origin but the coordinates from the gaze point origin and the field origin.

Incidentally, in the present embodiment, although the synthesis is performed by overwriting the distant object with the near object, the present invention is not limited to this. More specifically, with respect to the position and size of each object can, it is possible to derive their anteroposterior relationships from, for example, the field origin, the gaze point coordinates, the circumscribed cube coordinates and their sizes. Thus, since generation of the distant object that is hidden by the near object can be omitted, it is possible to perform image generation at high speed and at low cost.

Incidentally, as well as the first embodiment, the method of generating the virtual viewpoint image is not limited to this.

Third Embodiment

Next, a third embodiment of the present invention will be described.

Figure 19:
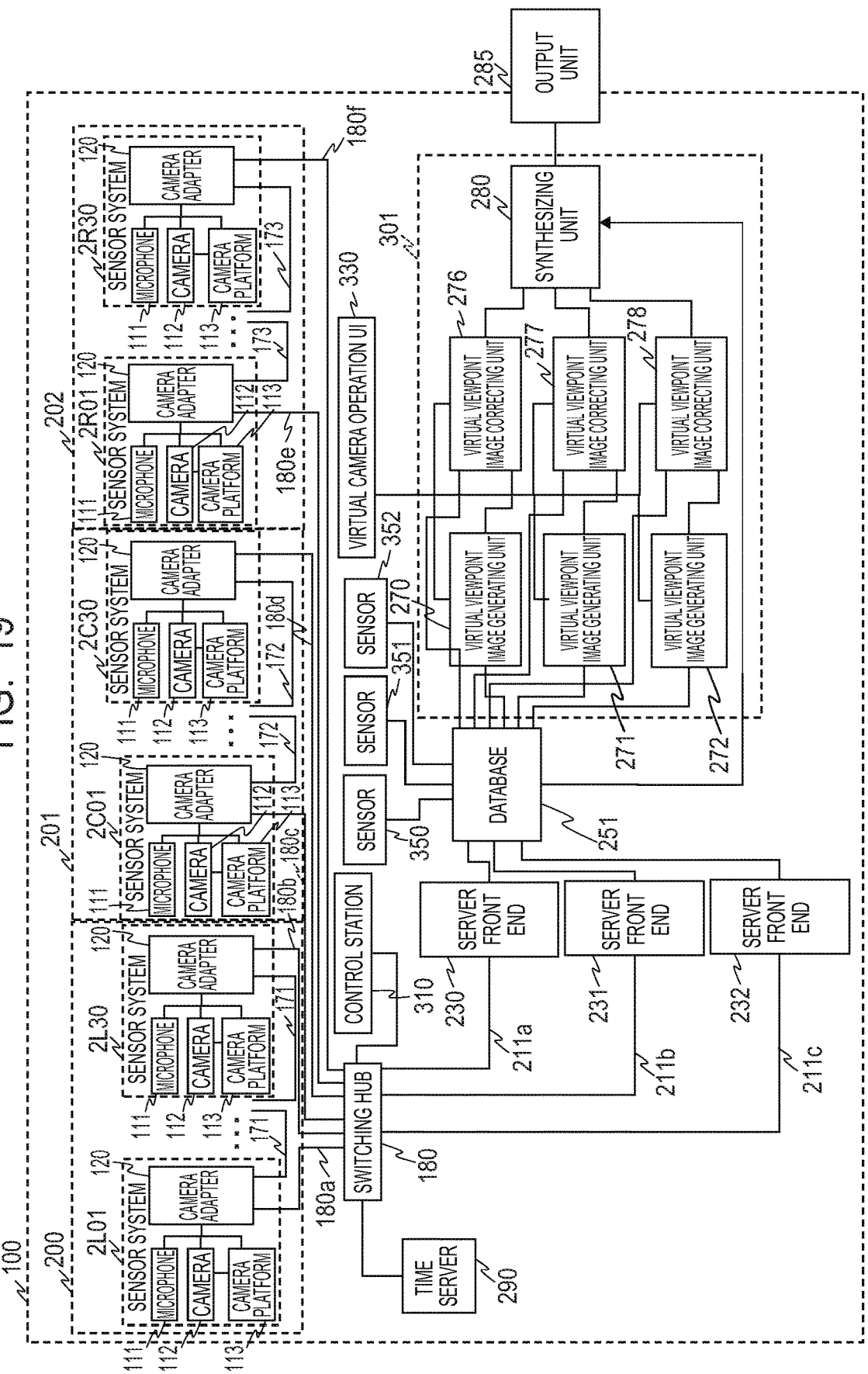
FIG. 19 is a diagram illustrating a constitution example of an image processing system in a third embodiment.

FIG. 19 is a diagram illustrating a constitution example of the image processing system 100 according to the third embodiment. In FIG. 19, the constituent elements having the same functions as those of the constituent elements illustrated in FIG. 1 are denoted by the same reference numerals respectively, and redundant descriptions are omitted. Sensors 350, 351 and 352 sense the weather conditions of a stadium. Examples of the weather conditions include humidity, temperature, weather and the like. A back-end server 301 has virtual viewpoint image correcting units 276, 277 and 278 in addition to the virtual viewpoint image generating units 270, 271 and 272. The stadium will be described as being the same as in the first embodiment.

The sensors 350, 351 and 352 are arranged at various locations in the stadium, and measure humidity and temperature as the environmental conditions at the time of capturing. The measured weather conditions are called weather information. The weather information is recorded in the database 250 at each time. For example, when the humidity is high, there are many water molecules in the atmosphere, so that a long-distance image appears blurred. More specifically, in the example of FIG. 5, the object in the capturing range 4002 is hazily seen from the virtual camera 2700 depending on the weather conditions. The haze has already been modeled as Mie scattering. Similarly, if it is raining, a distant image is hazily seen.

In the present embodiment, the generation of the virtual viewpoint image in each capturing range is the same as that in the first embodiment. Each of the virtual viewpoint image correcting units 276, 277 and 278 calculates haze and light attenuation based on the weather information and the distance between the virtual camera and the gaze point, and perform a haze process to the generated virtual viewpoint image. Thus, as well as the first embodiment, in relation to the generation of the virtual viewpoint image, since it is possible to generate a wide-area image from the virtual viewpoint without deteriorating quality, it is possible to improve the quality of the virtual viewpoint image. Moreover, by performing a correcting process to the virtual viewpoint image generated based on the weather conditions at the time of capturing, atmosphere or air feeling of the stadium can be reproduced, so that it is possible to generate the virtual viewpoint image closer to reality.

Incidentally, although the example in which the haze process is performed according to the distance of the gaze point has been described, the present invention is not limited to this. Namely, it is possible to perform the haze process also according to the distance between the object and the virtual camera. For example, the position of the circumscribed cube in the second embodiment can be easily calculated by referring to the coordinates of the gaze point from the stadium origin and the coordinates of the circumscribed cube from the gaze point.

Fourth Embodiment

Next, a fourth embodiment of the present invention will be described.

Figure 20:
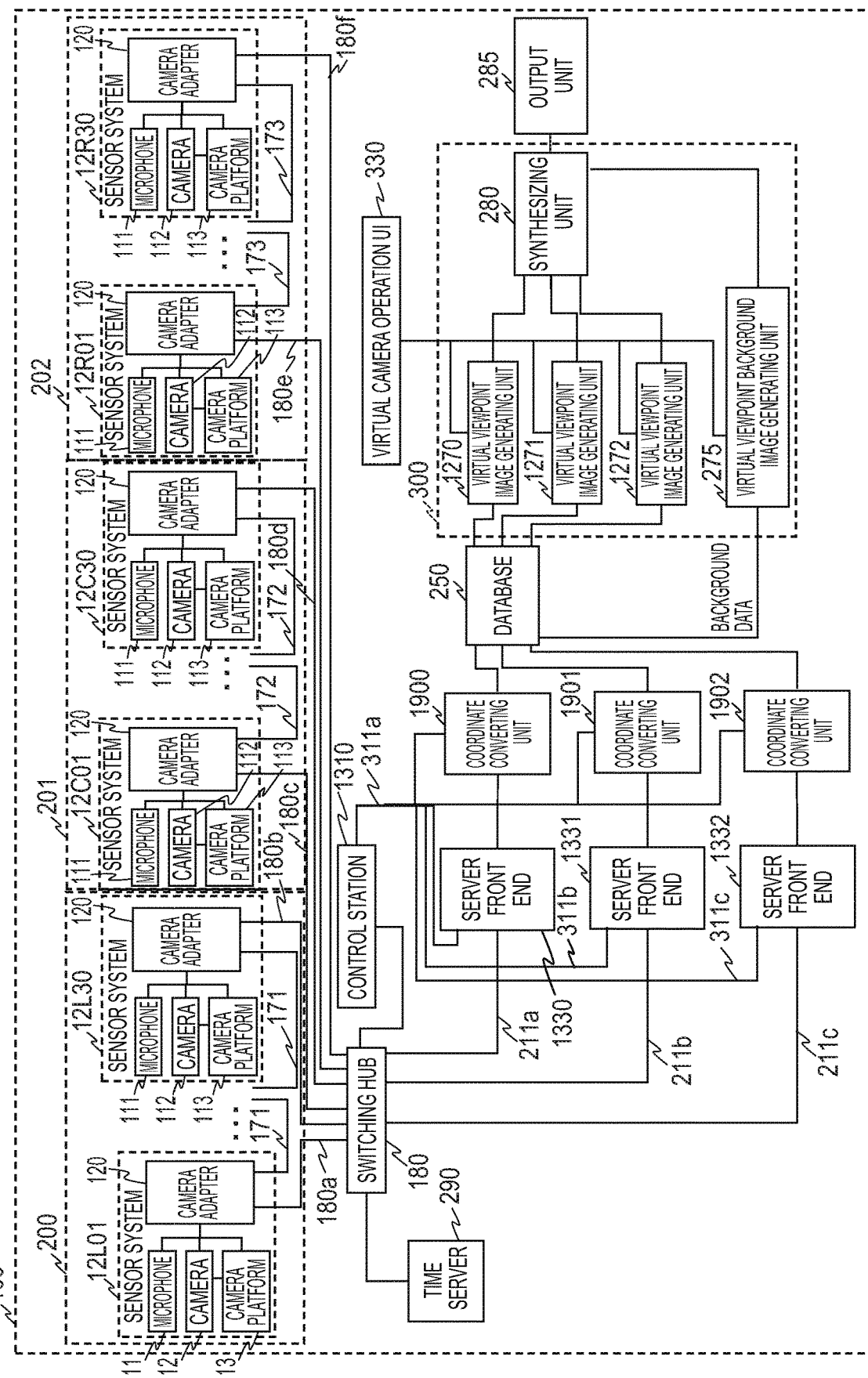
FIG. 20 is a diagram illustrating a constitution example of an image processing system according to another embodiment.

In the second embodiment, although the position of each object and the point coordinates of the point group are represented by the gaze point coordinates from the origin of the field and the coordinates from the gaze point of the circumscribed cube, the present invention is not limited to this. FIG. 20 is a diagram illustrating a constitution example of the image processing system 100 according to the fourth embodiment. In FIG. 20, the constituent elements having the same functions as those of the constituent elements illustrated in FIGS. 1 and 13 are denoted by the same reference numerals respectively, and redundant descriptions are omitted.

Figure 21:
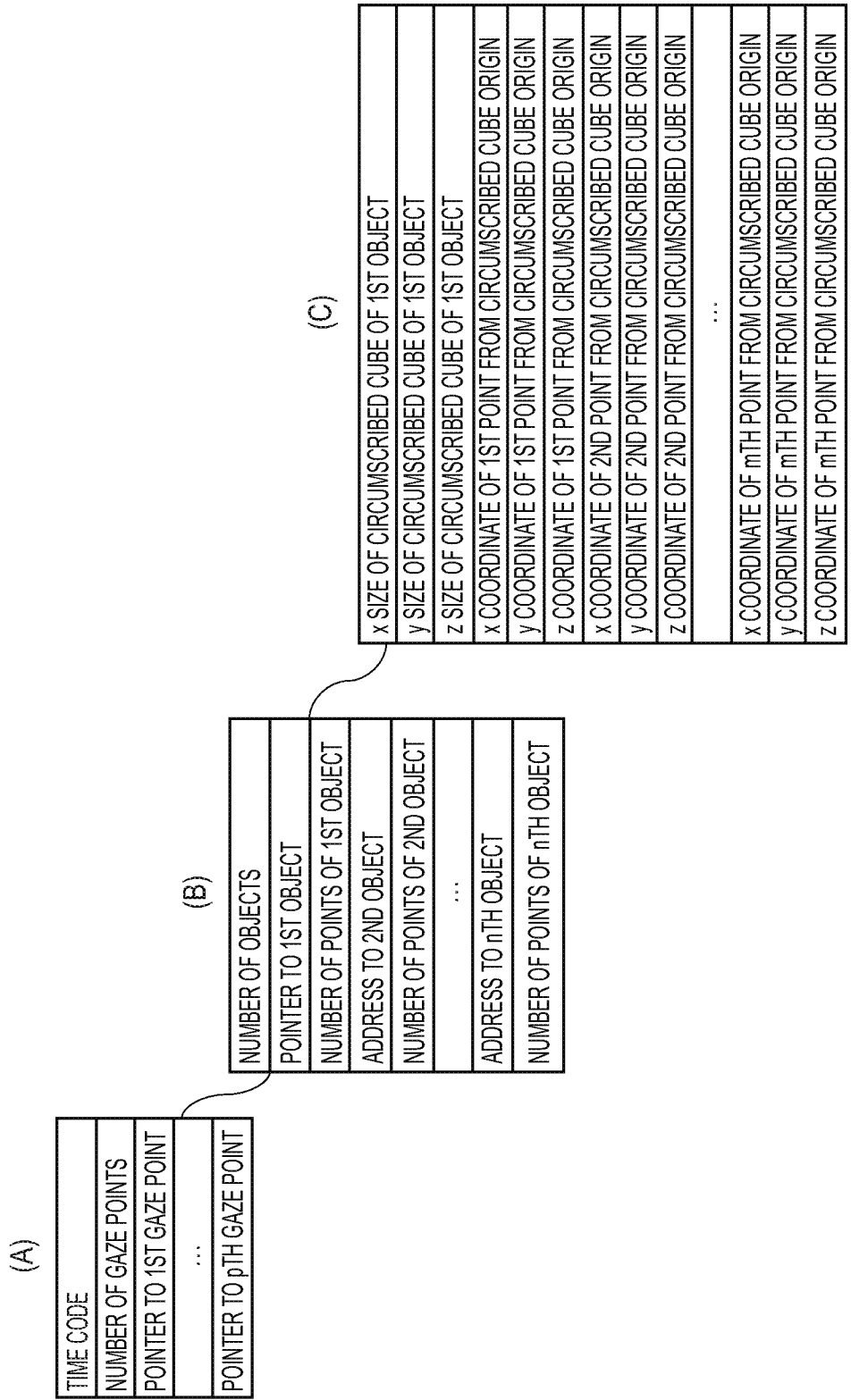
FIG. 21 is a diagram illustrating a constitution example of 3D model data in another embodiment.

A coordinate converting unit 1900 converts, in relation to the gaze point 2000, each circumscribed cube origin and each coordinate of the point group not into the relative coordinates from the gaze point origin but into the coordinates for the stadium origin. Similarly, coordinate converting units 1901 and 1902 convert, respectively in relation to the gaze points 2001 and 2002, the circumscribed cube origin and each coordinate of the point group not into the relative coordinates from the gaze point origin but into the coordinates for the stadium origin. The 3D model data converted in this way is stored as exemplarily illustrated in FIG. 21. However, the present invention is not limited to such a format. Namely, it is possible to omit the coordinates of the first gaze point from the stadium origin. Thus, all the points are represented by the coordinates for the stadium origin. Accordingly, by calculating them in advance, it is not necessary to calculate the respective positions from the differences of the coordinates in the rendering process, so that it is possible to speed up the image generation.

Incidentally, there may be an area where the plurality of gaze point areas overlap depending on the installation states of the cameras. In that case, for example, in relation to the 3D model data of the object, there is a case where the data of the same object exists for each gaze point area. In this case, all the data can be stored. However, if generation accuracy of the 3D model is different, there is a case where the quality of the finally generated virtual viewpoint image is affected. Therefore, for example, as described in the first embodiment, the data may be selected based on information of the position of the object and the gaze point area. For example, with respect to certain 3D model data, it is possible to perform a process of leaving only the data of the gaze point with the closest coordinates, and deleting the overlapping data in other gaze points.

Other Embodiments

The present invention can be realized also by a process in which a program for realizing one of more functions of the above embodiments are supplied to a system or an apparatus via a network or a storage medium and one or more processors in the system or the apparatus read and execute the supplied program. Besides, the present invention can be realized also by a circuit (e.g., an ASIC) of realizing one or more functions of the above embodiments.

Figure 22:
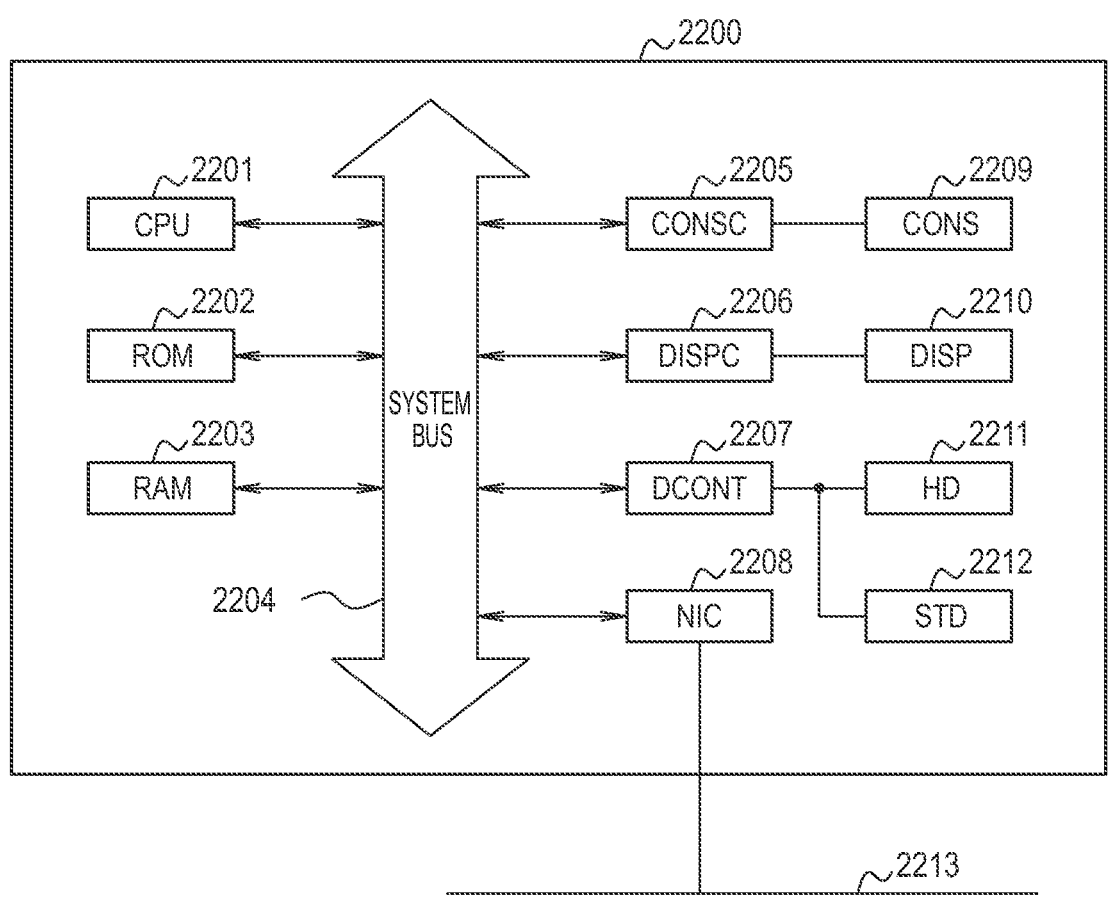
FIG. 22 is a diagram illustrating a computer function capable of realizing the image processing system in the embodiment.

For example, each of the image processing systems described in the first to fourth embodiments has a computer function 2200 as illustrated in FIG. 22, and a CPU 2201 thereof performs the operations in the first to fourth embodiments.

As illustrated in FIG. 22, the computer function 2200 has the CPU 2201, a ROM 2202 and a RAM 2203. Moreover, the computer function has a controller (CONSC) 2205 of an operation unit (CONS) 2209, and a display controller (DISPC) 2206 of a display (DISP) 2210 serving as a display unit such as a CRT, an LCD or the like. Moreover, the computer function has a controller (DCONT) 2207 of a storage device (STD) 2212 such as a hard disk (HD) 2211, a flexible disk and the like, and a network interface card (NIC) 2208. These functional units 2201, 2202, 2203, 2205, 2206, 2207 and 2208 are configured to be communicably connected to others via a system bus 2204.

The CPU 2201 comprehensively controls the respective constituent elements connected to the system bus 2204 by executing the software stored in the ROM 2202 or the HD 2211 or the software supplied from the STD 2212. That is, the CPU 2201 performs the control for realizing the operations in the first to fourth embodiments, by reading and executing processing programs for performing the above operations from the ROM 2202, the HD 2211 or the STD 2212. The RAM 2203 functions as a main memory, a work area or the like for the CPU 2201. The CONSC 2205 controls the instruction input from the CONS 2209. The DISPC 2206 controls the display of the DISP 2210. The DCONT 2207 controls the access to the HD 2211 and the STD 2212 that store a boot program, various applications, user files, a network management program, the processing programs in the first to fourth embodiments, and the like. The NIC 2208 bidirectionally exchanges the data with other apparatuses and devices on a network 2213.

The above embodiments are merely the examples of concretization for carrying out the present invention. Accordingly, the technical scope of the present invention should not be interpreted restrictively or limitedly by these embodiments. Namely, the present invention can be carried out in various forms without departing from the technical idea or the main feature of the present invention.

According to the present invention, it is possible to generate, in an image processing system having a plurality of image capturing units, a wide-area image from a high-quality virtual viewpoint.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A generating apparatus comprising:
   one or more memories storing instructions; and
   one or more processors that, on executing the instructions, perform operations including:
   obtaining first image data based on a first captured image obtained by a first image capturing device belonging to a first image capturing device group having a plurality of first image capturing devices pointed to a first area having a first gaze point, wherein the first image capturing device group is included in a plurality of image capturing device groups into which the plurality of first image capturing devices are classified,
   obtaining second image data based on a second captured image obtained by a second image capturing device belonging to a second image capturing device group having a plurality of second image capturing devices pointed to a second area, different from the first area, having a second gaze point, wherein the second image capturing device group is included in the plurality of image capturing device groups into which the plurality of second image capturing devices are classified,
   obtaining information that specifies a position of a virtual viewpoint and specifies a view direction from the virtual viewpoint, and
   generating a virtual viewpoint image based on the obtained first image data, the obtained second image data, the view direction from the virtual viewpoint specified by the obtained information, a first positional relationship between the position of the virtual viewpoint specified by the obtained information and the first gaze point, and a second positional relationship between the specified position of the virtual viewpoint and the second gaze point.

2. The generating apparatus according to claim 1, wherein the virtual viewpoint image is generated based on a distance between the specified position of the virtual viewpoint and the first gaze point, and a distance between the specified position of the virtual viewpoint and the second gaze point.

3. The generating apparatus according to claim 1, wherein the virtual viewpoint image has a plurality of image areas including a first image area and a second image area different from the first image area, wherein an image representing an object included in the first image area is generated based on the obtained first image data and wherein an image representing an object included in the second image area is generated based on the obtained second image data.

4. The generating apparatus according to claim 3,
   wherein the one or more processors executes the instructions to perform further operations including obtaining background image data related to a background at least different from an object, included in an image area, and
   obtaining a background image corresponding to a background in a case seen from the virtual viewpoint specified by the obtained information is generated based on the obtained background image data, and
   wherein the virtual viewpoint image is generated by synthesizing the image representing the object included in the first image area, the image representing the object included in the second image area, and the obtained background image.

5. The generating apparatus according to claim 4, wherein, in a case where a distance between the specified position of the virtual viewpoint and the first gaze point is longer than a distance between the specified position of the virtual viewpoint and the second gaze point, the virtual viewpoint image is generated by synthesizing the image representing the object generated based on the second image data and the background image in the second image area, after synthesizing the image representing the object generated based on the first image data and the background image in the first image area.

6. A generating apparatus comprising:
   one or more memories storing instructions; and
   one or more processors that, on executing the instructions, perform operations including:
   obtaining first image data based on a first captured image obtained by a first image capturing device belonging to a first image capturing device group having a plurality of first image capturing devices installed to capture a first position, wherein the first image capturing device group is included in a plurality of image capturing device groups into which the plurality of first image capturing devices are classified,
   obtaining second image data based on a second captured image obtained by a second image capturing device belonging to a second image capturing device group having a plurality of second image capturing devices installed to capture a second position different from the first position, wherein the second image capturing device group is included in the plurality of image capturing device groups into which the plurality of second image capturing devices are classified,
   obtaining information that specifies a position of a virtual viewpoint and specifies a view direction from the virtual viewpoint,
   obtaining first three-dimensional shape data that is generated based on the first captured image obtained by the first image capturing device, and that corresponds to an object within a first capturing range including the first position,
   obtaining second three-dimensional shape data that is generated based on the second captured image obtained by the second image capturing device, and that corresponds to an object within a second capturing range including the second position, and
   generating a virtual viewpoint image based on the obtained first image data, the obtained second image data, the view direction from the virtual viewpoint specified by the obtained information, a first positional relationship between the position of the virtual viewpoint specified by the obtained information and the first position, and a second positional relationship between the specified position of the virtual viewpoint and the second position, the obtained first three-dimensional shape data, and the obtained second three-dimensional shape data.

7. The generating apparatus according to claim 6, wherein the virtual viewpoint image is generated based on a distance between the virtual viewpoint position specified by the obtained information and the first position, and a distance between the specified position of the virtual viewpoint and the second position.

8. The generating apparatus according to claim 6,
wherein the virtual viewpoint image has a plurality of image areas including a first image area and a second image area different from the first image area,
wherein an image representing an object included in the first image area is generated based on the obtained first image data and the obtained first three-dimensional shape data, and, and
wherein an image representing an object included in the second image area is generated based on the obtained second image data and the obtained second three-dimensional shape data.

9. The generating apparatus according to claim 1,
wherein the first image data is image data of an object generated based on the first captured image obtained by the first image capturing device, and
wherein the second image data is image data of an object generated based on the second captured image obtained by the second image capturing device.

10. The generating apparatus according to claim 1,
wherein the first image data is data representing a texture of an object generated based on the first captured image obtained by the first image capturing device, and
wherein the second image data is data representing a texture of an object generated based on the second captured image obtained by the second image capturing device.

11. The generating apparatus according to claim 1,
wherein a first virtual viewpoint image is generated based on the obtained first image data and the obtained information,
wherein a second virtual viewpoint image is generated based on the obtained second image data and the obtained information, and
wherein the virtual viewpoint image is generated by synthesizing the first virtual viewpoint image and the second virtual viewpoint image.

12. The generating apparatus according to claim 1, wherein generating the virtual viewpoint image further includes generating the virtual viewpoint image based on an environmental condition at a time of capturing.

13. The generating apparatus according to claim 12, wherein at least one of humidity, temperature and weather is included in the environmental condition.

14. The generating apparatus according to claim 3, wherein the object included in the first image area or the objected included in the second image area is a moving body.

15. A method for a generating apparatus, the method comprising:
obtaining first image data based on a first captured image obtained by a first image capturing device belonging to a first image capturing device group having a plurality of first image capturing, devices pointed to a first area having a first gaze point, wherein the first image capturing device group is included in a plurality of image capturing device groups into which the plurality of first image capturing devices are classified;
obtaining second image data based on a second captured image obtained by a second image capturing device belonging to a second image capturing device group having a plurality of second image capturing devices pointed to a second area, different from the first area, having a second gaze point, wherein the second image capturing device group is included in the plurality of image capturing device groups into which the plurality of second image capturing devices are classified;
obtaining information that specifies a position of a virtual viewpoint and specifies a view direction from the virtual viewpoint; and
generating a virtual viewpoint image based on the obtained first image data, the obtained second image data, the view direction from the virtual viewpoint specified by the obtained information, a first positional relationship between the position of the virtual viewpoint specified by the obtained information and the first gaze point, and a second positional relationship between the specified position of the virtual viewpoint and the second gaze point.

16. A method for a generating apparatus, the method comprising:
obtaining first image data based on a first captured image obtained by a first image capturing device belonging to a first image capturing device group having a plurality of first image capturing devices installed to capture a first position, wherein the first image capturing device group is included in a plurality of image capturing device groups into which the plurality of first image capturing devices are classified;
obtaining second image data based on a second captured image obtained by a second image capturing device belonging to a second image capturing device group having a plurality of second image capturing devices installed to capture a second position different from the first position, wherein the second image capturing device group is included in the plurality of image capturing device groups into which the plurality of second image capturing devices are classified;
obtaining information that specifies a position of a virtual viewpoint and specifies a view direction from the virtual viewpoint;
obtaining first three-dimensional shape data that is generated based on the first captured image obtained by the first image capturing device, and that corresponds to an object within a first capturing range including the first position;
obtaining second three-dimensional shape data that is generated based on the second captured image obtained by the second image capturing device, and that corresponds to an object within a second capturing range including the second position; and
generating a virtual viewpoint image based on the obtained first image data, the obtained second image data, the view direction from the virtual viewpoint specified by the obtained information, a first positional relationship between the position of the virtual viewpoint specified by the obtained information and the first position, and a second positional relationship between the specified position of the virtual viewpoint and the second position, the obtained first three-dimensional shape data, and the obtained second three-dimensional shape data.

* * * * *